United States Patent [19]

Johnson et al.

[11] Patent Number: 5,781,744

[45] Date of Patent: Jul. 14, 1998

[54] METHOD AND APPARATUS FOR ENSURING SAFE PERIPHERAL CONNECTION

[75] Inventors: Mary B. Johnson; Lesley A. Bird; Robert Bailey, all of San Jose; Krishna Viswanadham, Mountain View; Mark Seibert, Cupertino, all of Calif.

[73] Assignee: Apple Computer, Inc., Cupertino, Calif.

[21] Appl. No.: 519,505

[22] Filed: Aug. 25, 1995

[51] Int. Cl.[6] .................................................. G06F 13/00
[52] U.S. Cl. .......................... 395/283; 395/828; 395/835
[58] Field of Search .............................. 395/281, 283, 395/309, 750, 830, 831, 835, 836, 838, 882, 284, 828

[56] References Cited

U.S. PATENT DOCUMENTS

| | | | |
|---|---|---|---|
| 5,317,697 | 5/1994 | Husak et al. | 395/283 |
| 5,323,291 | 6/1994 | Boyle et al. | 361/683 |
| 5,386,567 | 1/1995 | Lien et al. | 395/700 |
| 5,444,644 | 8/1995 | Divjak | 395/284 |
| 5,463,261 | 10/1995 | Skarda et al. | 307/131 |
| 5,473,499 | 12/1995 | Weir | 361/58 |
| 5,515,515 | 5/1996 | Kennedy et al. | 395/283 |
| 5,526,493 | 6/1996 | Shu | 395/281 |
| 5,548,782 | 8/1996 | Michael et al. | 395/835 |
| 5,564,024 | 10/1996 | Pemberton | 395/283 |
| 5,594,873 | 1/1997 | Garrett | 395/281 |
| 5,594,874 | 1/1997 | Narayanan et al. | 395/284 |
| 5,608,877 | 3/1997 | Sung et al. | 395/284 |

OTHER PUBLICATIONS

Wilson, Ron; "PicoPower eyes hot–docking," Electronic Engineering Times No. 858, p. 14, Jul. 24, 1995.
Morgenstern, David; "Power catches PCI wave with new line of clones," MacWeek vol. 9, No. 36, Sep. 11, 1995.

*Primary Examiner*—Glenn A. Auve
*Attorney, Agent, or Firm*—Beyer & Weaver, LLP

[57] ABSTRACT

An input/output interface apparatus that allows a computer system to have less ports and greater safety with the connection of peripheral devices to the ports is disclosed. The input/output interface apparatus enables the computer system to supply multiple bus standards to a single flexible port of the computer system. The input/output interface apparatus permits safe connection of a peripheral device to a port of the computer system when the computer system is powered-on (so called hot-plugging or hot-docking).

45 Claims, 13 Drawing Sheets

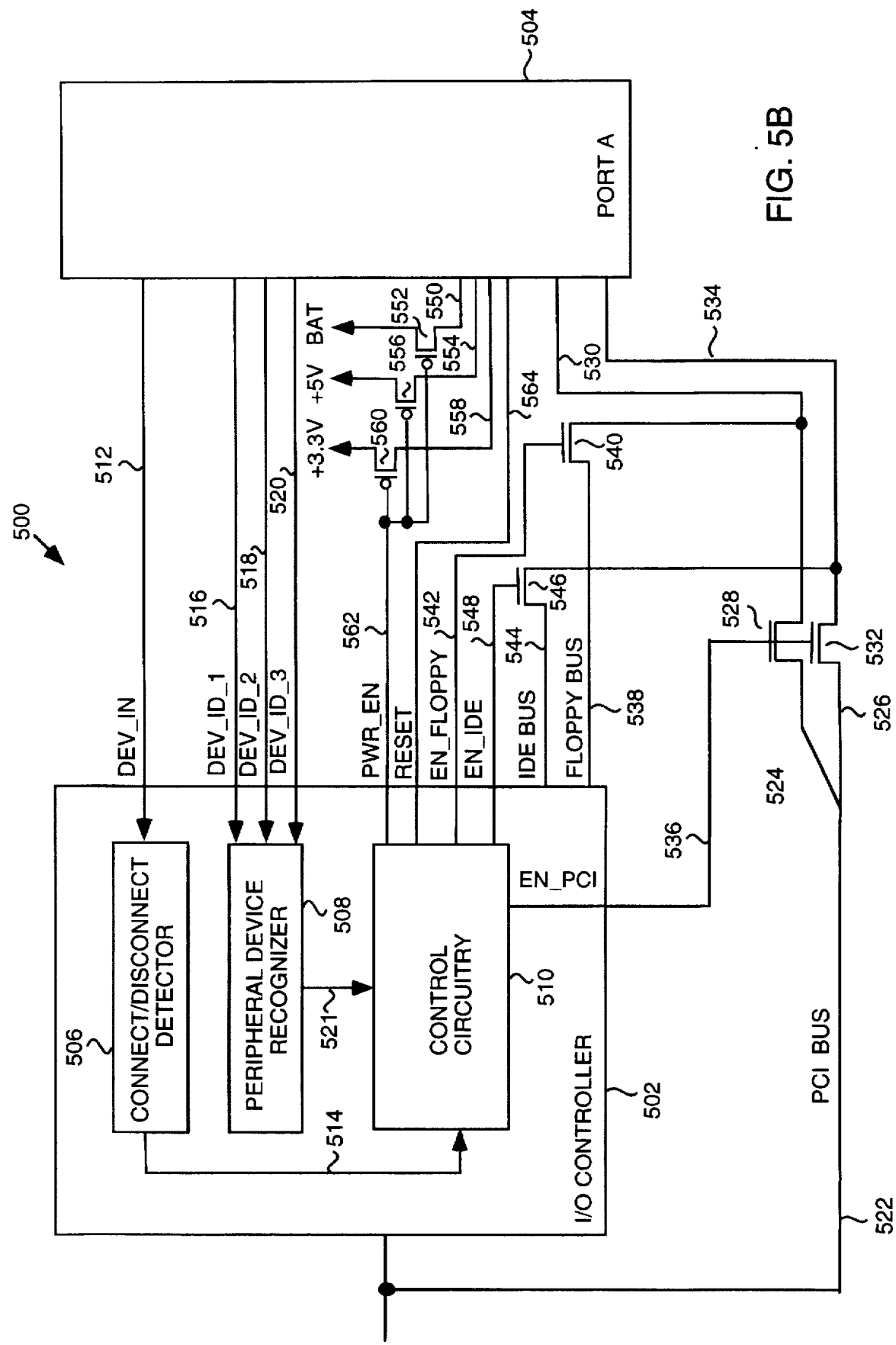

| # | | PCI | | | IDE/Floppy | | # | | PCI | | | IDE/Floppy |
|---|---|---|---|---|---|---|---|---|---|---|---|---|
| 1. | | RAW BAT | - | | RAW BAT | | 46. | I/O | DEVSEL~ | S | | nc |
| 2. | | RAW BAT | - | | RAW BAT | | 47. | | +5V | - | | +5V |
| 3. | | GND | - | | GND | | 48. | I/O | SERR~ | S | | nc |
| 4. | I/O | AD(31) | S | | nc | | 49. | I/O | FRAME~ | S | | nc |
| 5. | I/O | AD(30) | S | | nc | | 50. | I/O | TRDU~ | S | | nc |
| 6. | I/O | AD(29) | S | | nc | | 51. | I/O | IRDY~ | S | | nc |
| 7. | I/O | AD(28) | S | | nc | | 52. | O | GND | - | | GND |
| 8. | | +3V | - | | +3V | | 53. | O | BUF_PCI_RST~ | - | O | IDE_RST~ |
| 9. | I/O | AD(27) | S | | nc | | 54. | I/O | PAR | S | O | HDSEL |
| 10. | I/O | AD(26) | S | | nc | | 55. | I/O | PERR~ | S | O | FL_ENABLE~ |
| 11. | I/O | AD(25) | S | | IDE_INTRQ | | 56. | O | GNT~ | S | I | RDDATA |
| 12. | I/O | AD(24) | S | I | DMARQ | | 57. | | +5V | - | | +5V |
| 13. | | GND | - | | GND | | 58. | I | REQ~ | S | O | WRDATA |
| 14. | I/O | AD(23) | S | O | DMACK~ | | 59. | | Long GND | - | | Long GND |
| 15. | I/O | AD(22) | M | O | DA(2) | | 60. | I/O | C/BE(3)~ | S | O | PHASE(3) |
| 16. | I/O | AD(21) | M | O | DA(1) | | 61. | I/O | C/BE(2)~ | S | O | PHASE(2) |
| 17. | I/O | AD(20) | M | O | DA(0) | | 62. | | +5V | - | | +5V |
| 18. | | +3V | - | | +3V | | 63. | I/O | C/BE(1)~ | S | O | PHASE(1) |
| 19. | I/O | AD(19) | S | O | CS1FX~ | | 64. | I/O | C/BE(0)~ | S | O | PHASE(0) |
| 20. | I/O | AD(18) | S | O | CS3FX~ | | 65. | | GND | - | | GND |
| 21. | I/O | AD(17) | M | O | DIOW~ | | 66. | I | INTA~ | S | O | WRREQ~ |
| 22. | I/O | AD(16) | M | O | DIOR~ | | 67. | O | IN_USE_LED | - | O | IN_USE_LED |
| 23. | | Long GND | - | | Long GND | | 68. | | +5V | - | | +5V |
| 24. | I/O | AD(15) | M | I/O | IDE_D(15) | | 69. | O | PCI_CLK | S | | nc |
| 25. | I/O | AD(14) | M | I/O | IDE_D(14) | | 70. | | GND | - | | GND |
| 26. | I/O | AD(13) | M | I/P | IDE_D(13) | | 71. | I/O | DEV_ID(2) | - | I/O | DEV_ID(2) |
| 27. | I/O | AD(12) | M | I/O | IDE_D(12) | | 72. | I/O | DEV_ID(1) | - | I/O | DEV_ID(1) |
| 28. | | +3V | - | | +3V | | 73. | I/O | DEV_ID(1) | - | I/O | DEV_ID(0) |
| 29. | I/O | AD(11) | M | I/O | IDE_D(11) | | 74. | I | DEV_IN~ | - | I | DEV_IN~ |
| 30. | I/O | AD(10) | M | I/O | IDE_D(10) | | 75. | R | Reserved (Video) | - | R | Reserved (Video) |
| 31. | I/O | AD(9) | M | I/P | IDE_D(9) | | 76. | R | Reserved (Video) | - | R | Reserved (Video) |
| 32. | I/O | AD(8) | M | I/O | IDE_D(8) | | 77. | R | Reserved (Clk, GND) | - | R | Reserved (Clk,GND) |
| 33. | | GND | - | | GND | | 78. | | LONG AGND | - | | LONG AGND |
| 34. | I/O | AD(7) | M | I/O | IDE_(7) | | 79. | R | Reserved (Clock) | - | R | Reserved (Clock) |
| 35. | I/O | AD(6) | M | I/O | IDE_(6) | | 80. | R | SND_OUT_R | - | R | SND_OUT_R |
| 36. | I/O | AD(5) | M | I/O | IDE_(5) | | 81. | R | SND_OUT_RED | - | R | SND_OUT_RET |
| 37. | I/O | AD(4) | M | I/O | IDE_D(4) | | 82. | R | SND_OUT_L | - | R | SND_OUT_L |
| 38. | | +3V | - | | +3V | | 83. | 1 | SND_IN_R | - | 1 | SND_IN_R |
| 39. | I/O | AD(3) | M | I/O | IDE(3) | | 84. | 1 | SND_IN_RET | - | 1 | SND_IN_RET |
| 40. | I/O | AD(2) | M | I/O | IDE(2) | | 85. | 1 | SND_IN_L | - | 1 | SND_IN_L |
| 41. | I/O | AD(1) | M | I/O | IDE_D(1) | | 86. | | A3.3V | | | A3.3V |
| 42. | | Long GND | - | | Long GND | | 87. | I/O | TPA | - | I/O | TPA |
| 43. | I/O | AD(0) | M | I/O | IDE_D(0) | | 88. | I/O | TPA~ | - | I/O | TPA~ |
| 44. | I/O | STOP~ | M | 1 | IOCHRDY | | 89. | I/O | TPB | - | I/O | TPB |
| 45. | I/O | LOCK | S | | nc | | 90. | I/O | TPB~ | | I/O | TPB~ |

FIG. 9

| Pin number | Signal name | Pin number | Signal name |
|---|---|---|---|
| 1 | Reserved | 46 | Reserved |
| 2 | Reserved | 47 | Reserved |
| 3 | MB_+3V | 48 | MB_SND_L |
| 4 | MB_SND_COM | 49 | MB_SND_R |
| 5 | Reserved | 50 | Reserved |
| 6 | Reserved | 51 | Reserved |
| 7 | GND | 52 | Reserved |
| 8 | Reserved | 53 | Reserved |
| 9 | /DEV_IN | 54 | DEV_ID(0) |
| 10 | DEV_ID(1) | 55 | DEV_ID(2) |
| 11 | GND | 56 | Reserved |
| 12 | MB_+5V | 57 | Reserved |
| 13 | /WRREQ | 58 | GND |
| 14 | PHASE(0) | 59 | PHASE(1) |
| 15 | MB_+5V | 60 | PHASE(2) |
| 16 | PHASE(3) | 61 | GND |
| 17 | WRDATA | 62 | MB_+5V |
| 18 | FD_RD | 63 | /FL_ENABLE |
| 19 | HDSEL | 64 | /MB_IDE_RST |
| 20 | GND | 65 | Reserved |
| 21 | Reserved | 66 | Reserved |
| 22 | Reserved | 67 | MB_+5V |
| 23 | Reserved | 68 | Reserved |
| 24 | IOCHRDY | 69 | IDE_D(0) |
| 25 | GND | 70 | IDE_D(1) |
| 26 | IDE_D(2) | 71 | IDE_D(3) |
| 27 | MB_+3V | 72 | IDE_D(4) |
| 28 | IDE_D(5) | 73 | IDE_D(6) |
| 29 | IDE_D(7) | 74 | GND |
| 30 | IDE_D(8) | 75 | IDE_D(9) |
| 31 | IDE_D(10) | 76 | IDE_D(11) |
| 32 | MB_+3V | 77 | IDE_D(12) |
| 33 | IDE_D(13) | 78 | IDE_D(14) |
| 34 | IDE_D(15) | 79 | GND |
| 35 | /DIOR | 80 | /DIOW |
| 36 | /CS3FX | 81 | /CS1FX |
| 37 | Reserved | 82 | IDE_ADDR(0) |
| 38 | IDE_ADDR(1) | 83 | IDE_ADDR(2) |
| 39 | Reserved | 84 | GND |
| 40 | Reserved | 85 | IDE_INTRQ |
| 41 | Reserved | 86 | Reserved |
| 42 | Reserved | 87 | Reserved |
| 43 | Reserved | 88 | Reserved |
| 44 | Reserved | 89 | GND |
| 45 | MB_+BAT | 90 | MB_+BAT |

FIG. 13

METHOD AND APPARATUS FOR ENSURING SAFE PERIPHERAL CONNECTION

BACKGROUND OF THE INVENTION

1. Field of the Invention

The present invention relates generally to an input/output controller, and more particularly, to a method and apparatus for safely connecting a peripheral device to a port of a data processing system while the data processing system is powered-on. The invention also relates to an input/output controller capable of supporting multiple bus specifications on a single port.

2. Description of the Related Art

There are two major classes of personal computers. The first class of personal computers are known as desktop personal computers, and the second class of personal computers are known as portable personal computers. Because portable personal computers typically have less data storage capacity and smaller displays than do desktop personal computers, docking stations have been used to allow the portable computer user to "dock" the portable computer into the docking station. Once docked, the portable computer acts essentially like a desktop personal computer. Docking stations typically provide the portable computer with the option of using a larger display and additional data storage devices. The docking stations can also provide other additional hardware resources to the portable computer as well as facilitate many services such as battery recharging and network connection.

To physically "dock" a portable computer to a docking station requires the electrical connection of the portable computer to the docking station. The electrical connection is achieved with a connector. The connector supplies various signals, including address, data, power, and various other signals, between the two computers. A first half of the connector resides on a housing associated with the docking station and a second half of the connector resides on the backside of the portable computer. The docking action involves the connection of the second half of the connector on the back of the portable computer with the first half of the connector residing on the housing associated with the docking station. By coupling together the two devices using the connector, the portable computer is able to use the resources of the docking system which are typically a larger display and additional data storage devices.

One disadvantage associated with the prior art is that one cannot safely dock a portable computer to a docking station while either the portable computer or the docking station is turned on. Therefore, to safely dock, the user has to power down both the portable computer and the docking station and then power them back up again in order to use them together, i.e., docked portable computer.

Moreover, other peripheral devices typically need to connect to ports of a computer. For example, it is currently very popular to connect PCMCIA devices to computers. These connections require that the receiving computer has a port with a connector that is compatible with the connector used on the PCMCIA device. Other examples of peripheral devices frequently connected to computers include printers, disk drives, and network devices. These connections, like those with docking a portable computer, involve the connection of a connector on the peripheral device with a related connector on the computer. Conventionally, to safely make such connections (i.e., "dock" the peripheral device to the computer) the computer should be powered off prior to the connection. As before, requiring powering down whenever connecting peripheral devices is disadvantageous and unsatisfactory to most users. Hence, there is a need to enable these peripheral devices to be safely connected without requiring complete power-down.

In the context of docking, a docking station is a peripheral device to the portable computer, or vice versa. As mentioned above, to dock safely, the portable computer had to be powered down before being connected to the docking station.

Thus, the problem associated with the prior art is that to safely connect a peripheral device to a computer required the powering down of the computer (and possibly the peripheral device) before such connection is made. The requirement of powering down a computer system before connecting a peripheral device is unsatisfactory to most users because they want the flexibility to connect and disconnect peripheral devices from the computer system at will even when the computer is in use.

Many users find the power down requirement so burdensome that they perform unsafe connections at great risk to their computer and peripheral devices. For example, if the peripheral device is of a type not permitted to be connected to the port (connector) then one or both of the computer and the device could be damaged upon its connection, or its attempted connection, while the computer is on. Improper connection of a peripheral device that is permitted to be connected to the computer is also a hazard when power down is not performed. For example, if a first half of a connector and a second half of a connector are irregularly connected, or such irregular connection is attempted even when the connectors themselves prevent or discourage complete connection, then damage to the devices and/or electrical spikes or shorts may result. The electrical spikes or shorts can even lead to a lost of data in or damage to the computer system. Safe connection or safe docking, of course, mean that the connection or docking will not cause destruction of data or damage to either the peripheral device or the computer. Other approaches to avoiding spikes upon connection are described in U.S. Pat. No. 5,323,291, which is hereby incorporated by reference.

Thus, there is a need for a technique whereby a peripheral device can be safely connected (e.g., docked) to a computer without having to power down the computer.

Another related problem with ports of computers is the particular bus standard provided to the port. There are many different bus standards used in the computer industry. There are also always new bus standards being created and implemented. Because there are so many bus standards used by so many different peripheral devices, it is difficult to provide computers with ports which are able to support all the peripheral devices a user might seek to connect to the computer.

Examples of a few common I/O bus standards in the computer industry are:

(i) AppleSWIM (by Apple Computer, Inc.) or Intel's 82078 (provided by Intel 82078 Controller) for floppy disk drives;

(ii) IDE for such peripherals as hard drives and CD-ROMS;

(iii) SCSI (Small Component System Interface) for supporting multiple peripherals such as disk drives and CD-ROMS in a daisy chain fashion; and (iv) PCI (Peripheral Component Interconnect) which is an I/O bus standard that supports high speed I/O for a variety of peripheral devices including docking stations and network adapters.

PCI is a relatively new I/O bus standard which offers increased throughput as compared to earlier bus standards. The PCI standard uses 52 lines, 32 of the lines carry address and data in a multiplexed fashion, remaining 20 lines are used for other functions.

The difficulty with the usage of many different I/O bus standards is that the ports of a computer are designed and built to provide a certain I/O bus format to the peripheral devices connecting to the ports. Hence, it is often the case that different ports of a computer support different I/O bus standards. The difficulty is that as the number of different bus standards being used increases the need for additional ports arises. Moreover, to be compatible with earlier bus standards, the computers must support, not only the latest I/O bus standard, but also other older but still popular I/O bus standards.

Computers are built with a limited number of ports. Each port provided on a computer takes up space and increases the cost of the computer. Determining how many ports and what bus formats to provide is difficult because it tends to vary with users. With portable devices, the problem is even more difficult because the surface area available for ports (e.g., connectors) is limited. Moreover, as the size of connectors for the ports become larger and portable computers become more compact, the shortage of surface area becomes even more of a limitation.

Thus, in addition to the need for a technique whereby a peripheral device can be safely connected (e.g., docked) to a computer without having to power down the computer, there is an ever increasing need to reduce the number of ports needed on portable computers.

SUMMARY OF THE INVENTION

Broadly speaking, the invention allows a data processing system to safely connect peripheral devices to the ports. Namely, the invention concerns apparatus and techniques for safely connecting a peripheral device to a port of a data processing system when the data processing system is powered-on. The invention also allows a data processing system to support more I/O bus standards with less ports. In particular, the invention enables a data processing system to supply multiple bus standards to a single flexible port of the data processing system. Implementations or embodiments of the invention may include one or both features of the invention.

A first implementation of the invention pertains to an input/output apparatus for a peripheral port of a data processing system, where a peripheral device connects to the data processing system by coupling to the peripheral port. The input/output apparatus includes a connect/disconnect detector for determining whether a device has been connected to or disconnected from the peripheral port, a peripheral device recognizer for recognizing a type of the device that has been connected to the peripheral port, and control circuitry for supplying power to the peripheral port for the device that has been connected to the peripheral port only after the type of the device is recognized by the peripheral device recognizer and for withdrawing power from the peripheral port whenever the device is disconnected from the peripheral port.

Preferably, the control circuitry further couples bus signals to the peripheral port a first predetermined amount of time after power is supplied to the peripheral port, or alternatively, after the presence of the power at the peripheral port is detected, and thereafter activates the peripheral port a second predetermined amount of time after the bus signals are coupled to the peripheral port. Further, the bus signals coupled to the peripheral port preferably have an I/O bus format dependent upon the type of the device connected to the peripheral port. Two devices can optionally also be simultaneously connected to the peripheral port where they can each receive I/O signals in accordance with a different bus standard.

A second implementation of the invention pertains to an input/output interface apparatus for at least one peripheral port of a data processing system. In this second implementation, the apparatus includes an input/output (I/O) controller for receiving a first I/O bus and producing a second I/O bus and a third I/O bus, and for producing I/O bus selection signals; a port connector for receiving I/O bus lines; and isolation circuits for individually isolating the second and third I/O buses from the I/O bus lines of the port connector in accordance with the I/O bus selection signals. Preferably, the input/output controller includes: a connect/disconnect detector for determining whether a device has been connected or disconnected, a peripheral device recognizer for recognizing a type of the device that the connect/disconnect detector determines has been connected, and control circuitry for producing the I/O bus selection signals.

A third implementation of the invention pertains to an apparatus for safely connecting a peripheral device to a port of a data processing system while the data processing system is powered-on. The apparatus includes: detection means for determining whether a peripheral device has just been connected to or disconnected from the port; means for removing activation signals from the port when the detection means determines that the peripheral device has just been disconnected or when there is no peripheral device connected to the port; recognition means for determining whether the peripheral device connected to the port is a type that is recognized; and means for supplying the activation signals to the port only after the recognition means determines that the type of the peripheral device connected to the port is recognized.

A fourth implementation of the invention pertains to a method for activating a port of a data processing system. The method including the following operations: determining whether a peripheral device has just been connected to the port while the data processing system is poweredon, receiving a peripheral identifier from the peripheral device determined to have been just connected, determining whether the peripheral device determined to have been just connected is recognizable based on a peripheral identifier associated with the peripheral device, and activating the port only after the peripheral device determined to have been just connected is recognized. The method may also immediately deactivate the port when the peripheral device is disconnected from the port.

Other aspects and advantages of the invention will become apparent from the following detailed description, taken in conjunction with the accompanying drawings, illustrating by way of example the principals of the invention.

BRIEF DESCRIPTION OF THE DRAWINGS

The invention will be readily understood by the following detailed description in conjunction with the accompanying drawings, wherein like reference numerals designate like structural elements, and in which:

FIG. 5B is a detailed schematic diagram of an input/output interface apparatus according to the embodiment of the invention shown in FIG. 3;

FIG. 9 illustrates pin assignments for a preferred embodiment of a connector associated with port A in FIG. 5B;

FIG. 13 illustrates pin assignments for a preferred embodiment of a connector associated with the port in FIG. 12.

DETAILED DESCRIPTION OF THE INVENTION

Embodiments of the invention are discussed below with reference to FIGS. 1–13. However, those skilled in the art will readily appreciate that the detailed description given herein with respect to these figures is for explanatory purposes as the invention extends beyond these limited embodiments.

The invention allows a data processing system to safety connect peripheral devices to the ports when the data processing system is powered-on. The invention also allows the data processing system to support more I/O bus standards with less ports.

Figure 1:
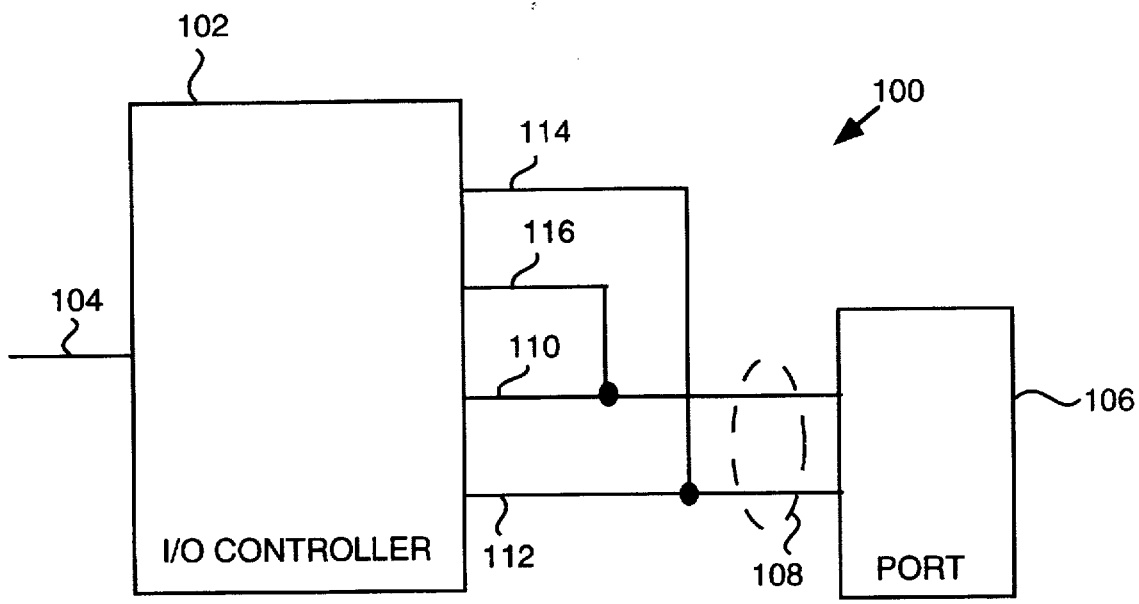
FIG. 1 is a block diagram of an input/output interface apparatus according to an embodiment of the invention.

FIG. 1 is a basic block diagram of an input/output (I/O) interface apparatus 100 according to an embodiment of the invention. The I/O interface apparatus 100 is typically used with a data processing system to control input and output operations between the data processing system and a port having a peripheral device connected thereto. The I/O interface apparatus 100 includes an input/output (I/O) controller 102 which controls input and output operations. A first bus (incoming data bus) 104 is connected to the I/O controller 102. Typically, the first bus is from a data processing system. The I/O controller 102 is connected to a port 106 via I/O port wires 108. The I/O port wires 108 supply data and other signals to and from a peripheral device connected to the port 106. The I/O port wires are partition into a first set of port wires 110 and a second set of port wires 112.

In addition, the I/O controller 102 also produces a second bus on the port wires 114 and a third bus on the port wires 116. The second and the third buses 114, 116 are different bus standards then the standard of the first bus 104. The second and third buses 114, 116 are produced by converting the first bus (incoming bus) 104 as is known in the art. Hence, here the I/O interface apparatus 100 can either send and receive signals from the I/O controller 102 to the port 106 using either the first bus 104 or using the second bus 114 and/or the third bus 116. Regardless of which bus standard to be sent to the port 106, the same I/O port wires 108 are used.

When the first bus 104 is to be used at the port 106, the I/O port wires 108 are coupled to the first bus 104 and the second and third buses 114, 116 are isolated from the I/O port wires. On the other hand, when the second bus 114 and/or the third bus 116 is (are) to be used, then the second bus 114 and/or the third bus 116 are coupled to the I/O port wires 108 and the first bus 104 is isolated from the I/O port wires 108. Hence, by sharing the I/O port wires 108, the I/O controller 102 is able to support multiple bus formats or standards at a common port. With this arrangement, two buses can be concurrently supplied to the port such that two peripheral devices can be simultaneously connected and supported by the port 106.

Figure 2:
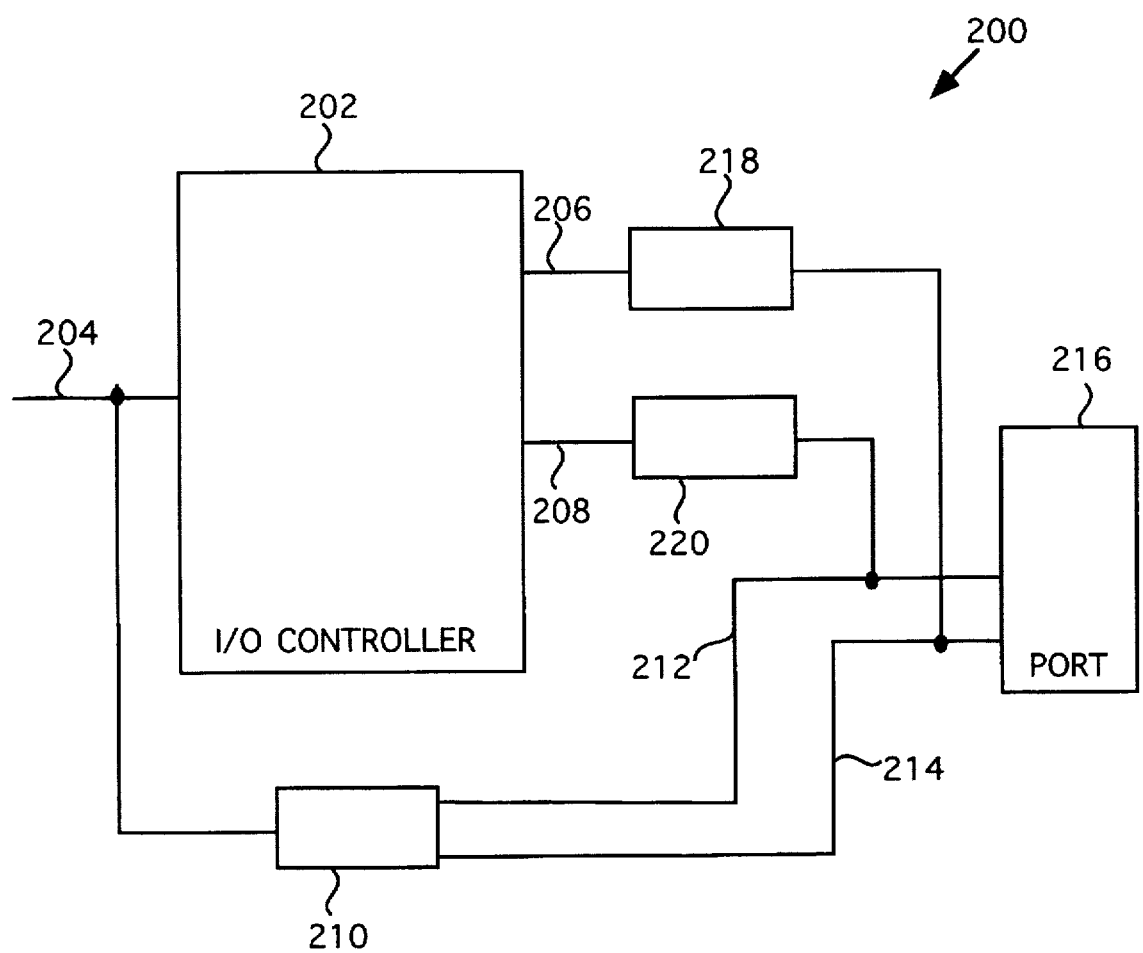
FIG. 2 is a block diagram of an input/output interface apparatus according to another embodiment of the invention.

FIG. 2 is a block diagram of an I/O interface apparatus 200 according to an embodiment of the invention. Like FIG. 1, FIG. 2 illustrates only a single port (port 216) being controlled by an I/O controller 202. The I/O controller 202 receives a first bus (incoming bus) 204 and produces a second bus 206 and a third bus 208 therefrom. The first bus 204 is also supplied to an isolation circuit 210. I/O port wires 212, 214 connect the isolation circuit 210 to a port 216. The isolation circuit 210 operates to couple or isolate the I/O port wires 212, 214 with the first bus 204. Also, isolation circuit 218 is used to couple or isolate the second bus 206 with the I/O port wires 214, and the isolation circuit 220 is used to couple or isolate the third bus 208 with the I/O port wires 212.

The apparatus 200 in FIG. 2 performs the same operations and achieves the same advantages as the I/O interface apparatus 100 in FIG. 1. However, the isolation circuits 210, 218 and 220 used in FIG. 2 are external to the I/O controller 202. Whereas in FIG. 1, the same sort of isolation is provided internal to the I/O controller 102.

Figure 3:
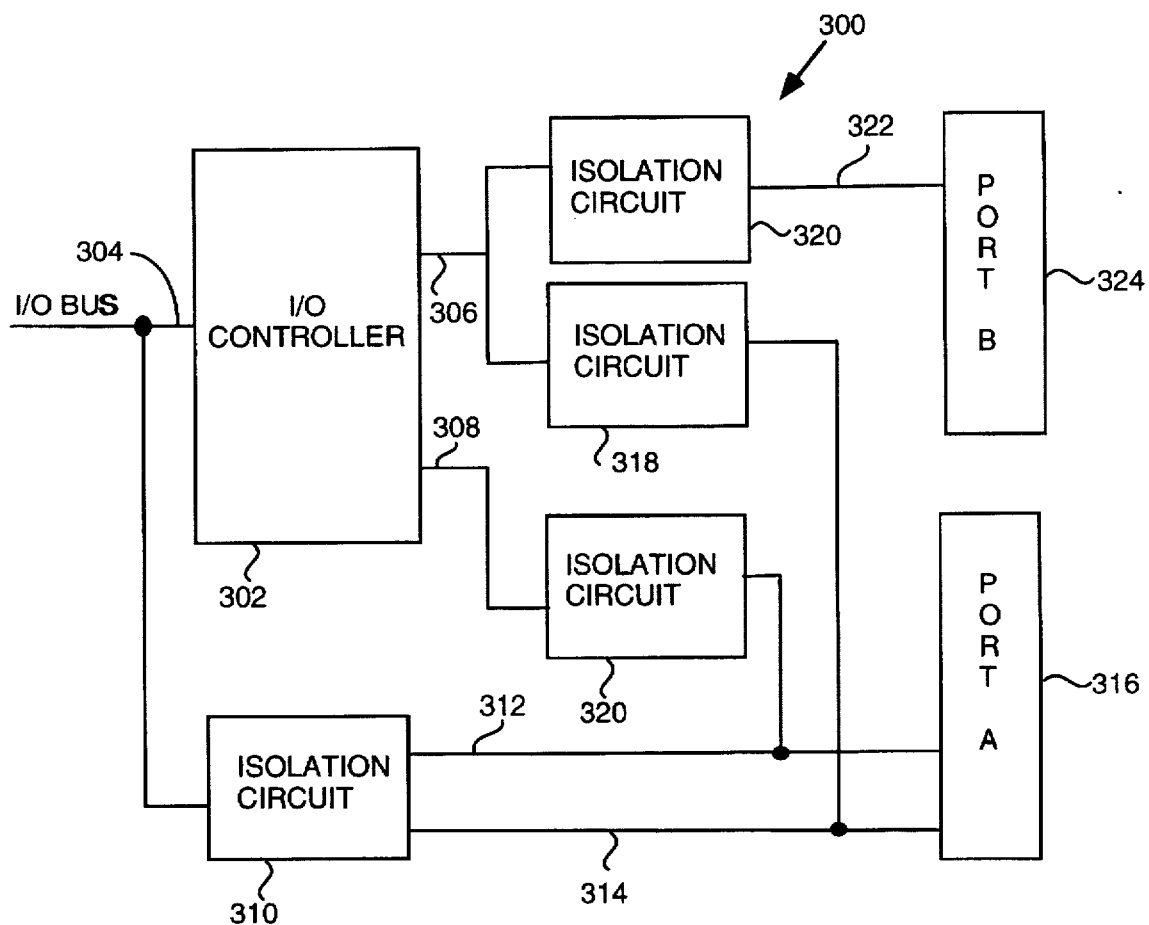
FIG. 3 is a block diagram of an input/output interface apparatus according to another embodiment of the invention.

FIG. 3 is a block diagram of an I/O interface apparatus 300 according to an embodiment of the invention. The I/O interface apparatus 300 controls I/O operations according to the invention. The I/O interface apparatus 300 is typically part of a data processing system (e.g., computer) and includes an I/O controller 302 which receives an I/O bus 304 as a first bus, and produces a second bus 306 and a third bus 308 which conform to different I/O bus standards. The I/O bus 304 is also supplied to an isolation circuit 310 which isolates or couples the I/O bus 304 with port wires 312 and 314. The port wires 312 and 314 are connected to port A 316. The second bus 306 is supplied to isolation circuits 318 and 320. The isolation circuit 318 operates to isolate or couple the second bus 306 with the port wires 314 associated with the port A 316. The isolation circuit 320 operates to isolate or couple the second bus 306 with port wires 322 associated with port B 324. An isolation circuit 326 is also provided to either isolate or couple the third bus 308 with the port wires 312 associated with the port A 316. The isolation circuits 310, 318, 320 and 326 are bi-directional. Preferably, although not shown in FIG. 3, the isolation circuits 310, 318, 320 and 326 are controlled by control signals generated by the I/O controller 302.

As shown in FIG. 3, port B 324 is capable of receiving the second bus 306. For example, assuming that the second bus 306 is an IDE bus, then the isolation circuit 320 can then provide IDE bus signals to the port B 324. Hence, a peripheral device, such as a disk drive device, may be coupled to the port B 324 and may communicate with the computer system using IDE bus signals. In contrast, the port A 316 is able to support peripheral devices utilizing either the first bus 304, the second bus 306, the third bus 308, or the second bus 306 and the third bus 308 together. The isolation circuits 310, 318 and 326 are used to control which of the first, second and third buses 304, 306 and 308 is coupled to the port wires 312 and 314 associated with the port A 316. As will become more apparent below, the invention allows the port A 316 to support different I/O bus standards.

For example, assume that the first bus 304 is a PCI bus, that the second bus is an IDE bus, and that the third bus 308 is a floppy bus. Then, the port A 316 can support either the PCI bus using port wires 312 and 314, or, in the alternative, can support the floppy bus on the port wires 312 and/or the IDE bus in the port wires 314. As a result, the port A 316 which is primarily designed for the PCI bus can support not only peripheral devices utilizing the PCI bus standard, but also peripheral devices using the IDE or floppy bus standards. In fact, the port A 316 can support both the IDE bus standard and the floppy bus standard concurrently. This provides a great deal of savings for a portable computing device because a single connector associated with the port A 316 is a flexible port that is able to interact with a peripheral device connected thereto using different I/O bus standards. Given the assumptions concerning I/O buses made above, in embodiment shown in FIG. 3, the port A 216 can use either the PCI bus, IDE bus or floppy bus with a peripheral device connected thereto. Further, the port A 316 could also use IDE and floppy buses concurrently, in which case the port A 316 would support two peripheral devices (one peripheral device using IDE and another peripheral device using floppy).

It should be noted that although isolation circuits are described as separate circuits or devices in certain of the above embodiments, the isolation can also be provided internal to the I/O controller (see e.g., FIG. 1). Furthermore, the number and the format or standard of the buses supported by the I/O controllers can vary widely depending on the implementation.

Figure 4:
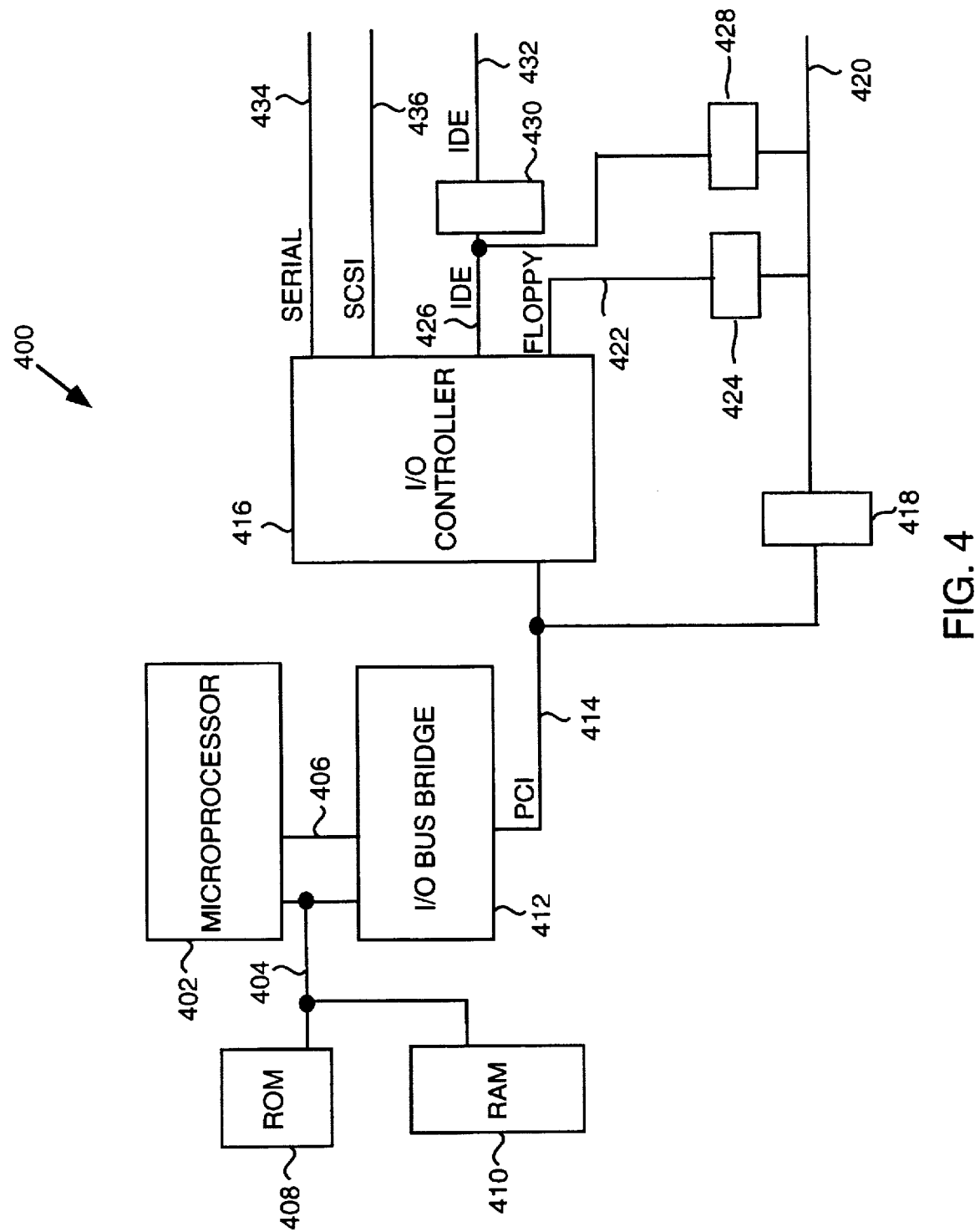
FIG. 4 is a block diagram of a computer system according to another embodiment of the invention.

FIG. 4 is a basic block diagram of a computer system 400 according to an embodiment of the invention. The invention primarily relates to the input and output operations of the computer system 400. The computer system 400 includes a microprocessor 402 that is coupled to a memory bus 404 and an internal I/O bus 406. The memory bus 404 serves to connect the microprocessor 402 with ROM 408 and RAM 410. The computer system 400 also includes an I/O bus bridge 412 which operates to bridge the internal I/O bus 406 to a PCI bus 414. Typically, a bus bridge is used to bridge between two different input/output standards. In the embodiment illustrated in FIG. 4, the microprocessor 402 is preferably PowerPC™ 603/604 and the internal bus 406 preferably follows the ISA standard. The bridging provided by the I/O bus bridge 412 is necessary if the computer system 400 is to support the PCI bus 414 because the microprocessor 402 was designed and built to use a different I/O bus (e.g., ISA). The computer system 400 further includes an I/O controller 416 which controls input and output operations with multiple peripheral devices via multiple ports and varying bus standards. The PCI bus 414 is connected to the I/O controller 416 and an isolation circuit 418. The output of the isolation circuit 418 is coupled to I/O port wires 420. The I/O port wires 420 are connected to a port (e.g., connector) to which a peripheral device connects. The I/O port wires 420 supply data and other signals (from the computer system 400) to and from the peripheral device which may be connected thereto.

The I/O controller 416 operates to control the signals sent to and received from one or more ports of the computer system 400. Usually, the I/O controller 416 controls ports having I/O bus standards other than the I/O bus standard internally provided in the computer system 400. The bus standards described and illustrated with respect to FIG. 4 are illustrative and desirable for computers (particularly portable computers) available today. In the embodiment shown in FIG. 4, the I/O controller 416 has the ability to control a floppy disk drive, an IDE peripheral device, a SCSI peripheral device, and a serial peripheral device (these devices not shown). To control the floppy disk drive, the I/O controller 416 produces a floppy bus 422 (e.g., AppleSWIM or Intel 82708) which is connected to an isolation circuit 424. The isolation circuit 424 has the ability to couple the floppy bus 422 to the I/O port wires 420 or isolate the floppy bus 422 from the I/O port wires 420. Similarly, to support an IDE peripheral device, the I/O controller 416 produces an IDE bus 426. The IDE bus 426 is supplied to isolation circuits 428 and 430. The isolation circuit 428 is able to couple the IDE bus 426 to the I/O port wires 420 or isolate the IDE bus 426 from the I/O port wires 420. The isolation circuit 430 has the ability to couple the IDE bus 426 to IDE port wires 432. In the case where both the IDE port wires 432 and the I/O port wires 420 utilize the IDE bus 426, the I/O controller 416 time-shares the IDE bus 426 between the two ports. The I/O controller 416 also has the ability to produce a serial bus 434 and a SCSI bus 436 which can be respectively supplied to a serial port and a SCSI port. The isolation circuits 418, 424, 428 and 430 provide bi-directional isolation for each line or wire of the respective bus and are preferably controlled by control signals from the I/O controller 416.

Figure 5A:
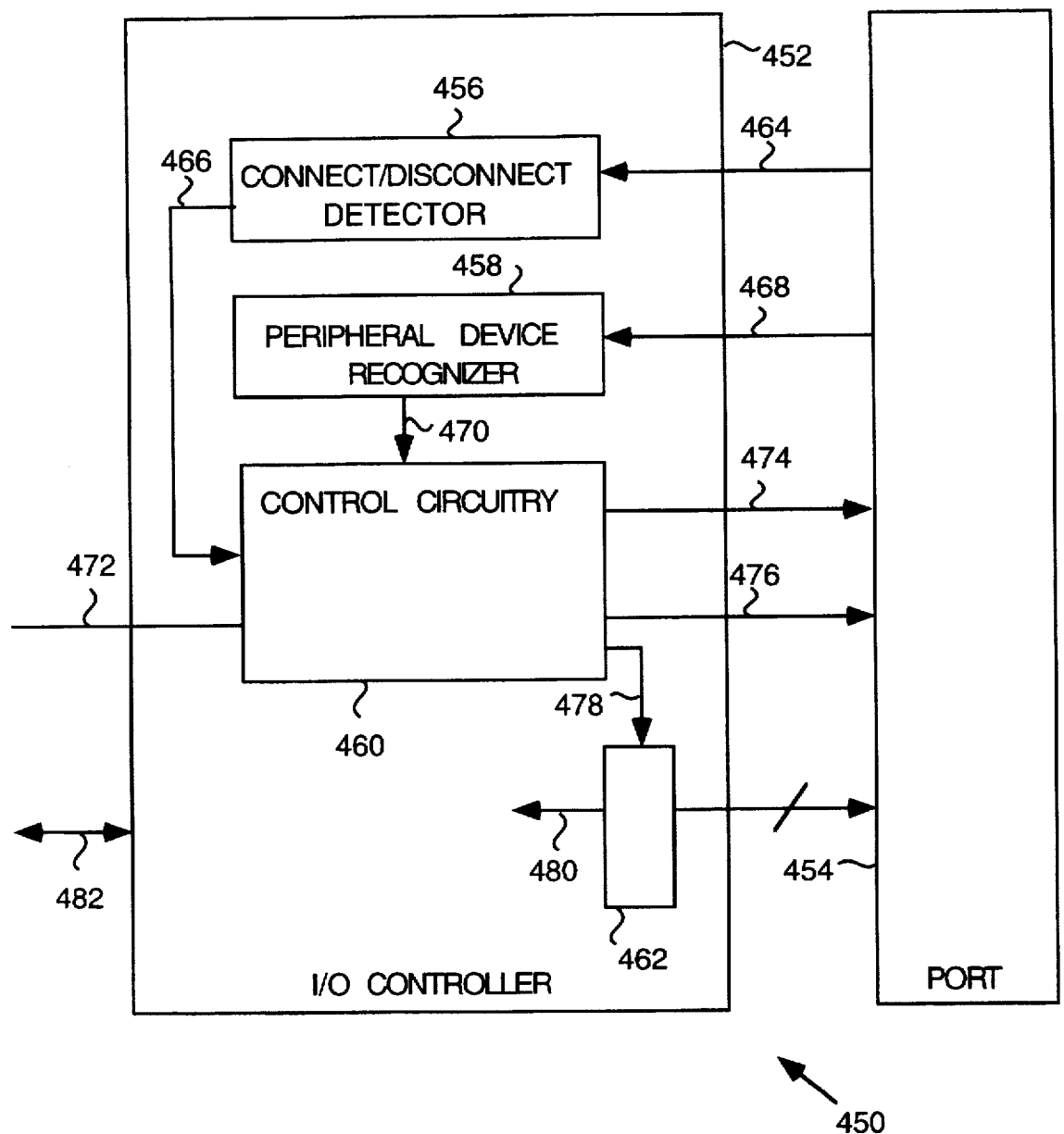
FIG. 5A is a block diagram of an input/output interface apparatus according to another embodiment of the invention.

FIG. 5A is a block diagram of an I/O interface apparatus 450 according to another embodiment of the invention. The I/O interface apparatus 450 includes an I/0 controller 452 and a port 454 and operates to ensure safe connection of a peripheral device to the port.

The I/O controller 452 includes a connect/disconnect detector 456, a peripheral device recognizer 458, control circuitry 460, and isolation circuitry 462. The connect/disconnect detector 456 receives a connect/disconnect signal 464 from the port 454 indicating whether or nor a peripheral device is connected to the port 454, and produces a control signal 466. The peripheral device recognizer 458 receives a device identifier 468 and produces a recognition signal 470 based on whether or not the peripheral device recognizer recognizes the device identifier 468. Based on the control signal 466, the recognition signal 470, and a software-controlled signal 472, the control circuitry 460 determines whether it is safe to activate the port 454 or whether the port 454 is to be deactivated. When the port is activated 454 a power signal 474, a reset signal 476, and bus signals 480 are supplied to the port 454 in the manner described in FIG. 6 below. The control circuitry 460 produces an enable signal 478 that controls whether the isolation circuitry 462 couples or isolates the bus signals 480 with the port 454. On the other hand, when the port 454 is to be deactivated, the power signal 474, the reset signal 476 and the bus signal 480 are removed (not supplied) to the port 454 in the manner described in FIG. 7 below. The bus signals 480 are removed from the port 454 by the enable signal 478 causing the isolation circuitry 462 to isolate the bus signals 480 from the port 454. The bus signals 480 are the same as or converted from incoming bus signals 482. The software-controlled signal 472 can also be used (directly or by setting bits in a control register within the I/O controller 452) to influence whether or not (and how) the port 454 is activated. For example, the software-controlled signal 472 can deactivate the port 454 to conserve energy or the software-controlled signal 472 can be used to select from different bus standards to be supplied to the port 454.

FIG. 5B is a detailed schematic diagram of an I/O interface apparatus 500 according to an embodiment of the invention. FIG. 5 is essentially a detailed schematic diagram of the apparatus 300 shown in FIG. 3.

The I/O interface apparatus 500 includes an I/O controller 502 that controls input and output operations for a computer system with respect to port A 504. The I/O controller 502 can also support additional ports as shown in FIGS. 1 and 2. The I/O controller 502 includes a connect/disconnect detector 506, a peripheral device recognizer 508, and control circuitry 510.

The connect/disconnect detector 506 receives a DEV_IN signal on line 512 from the port A 504. Using this DEV_IN signal, the connect/disconnect detector 506 determines whether a peripheral device is connected to the port A 504. Preferably, the DEV_IN signal is provided on a single bit line 512 which floats high until the line is pulled low by a peripheral device being connected to the port A 504. Using the DEV_IN signal the connect/disconnect detector 506 produces a control signal 514.

The peripheral device recognizer 508 receives a device identifier from the port A 504. In this embodiment, the device identifier consists of three different one-bit lines provided on three different lines from the port A 504. The device identifier includes DEV_ID_1 on line 516, DEV_ID_2 on line 518, and DEV_ID_3 on line 520. The peripheral device recognizer 508 uses the device identifier (DEV_ID_1, DEV_ID_2 and DEV_ID_3) to identify a type of the peripheral device connected to the port A 504. The type identified is preferably associated with the I/O bus standard utilized by the peripheral device. Based on the device identifier, the peripheral recognizer 508 produces a recognition signal 521. The recognition signal 521 indicates to the control circuitry 510 whether or not the peripheral device connected to the port A 504 is recognized. As an example, the peripheral device recognizer 508 may understand from the device identifier that the following codes (listed in Table 1 below) indicate certain types of I/O bus formats for peripheral devices.

TABLE 1

| DEV_ID_1 | DEV_ID_2 | DEV_ID_3 | TYPE |
| --- | --- | --- | --- |
| 0 | 0 | 0 | Floppy |
| 0 | 0 | 1 | IDE |
| 0 | 1 | 0 | PCI |
| 0 | 1 | 1 | Battery |

Therefore, if the peripheral device connected to the port A 504 causes a "0" (low logic state) on DEV_ID_1, a "1" (high logic state) on DEV_ID_2, and a "0" on DEV_ID_3, then the peripheral device recognizer 508 will recognize the peripheral device as one using the PCI bus standard and will so inform the control circuitry 510 with the recognition signal 521. The control circuitry 510 will use the control signal 514 and the recognition signal 521 to provide various control signals for the I/O interface apparatus 500.

The I/O controller 502 receives a PCI bus 522 as the primary I/O bus of the computer system to which the I/O controller 502 connects. To provide flexibility at the port A 504, the PCI bus 522 is also split into a first portion 524 and a second portion 526. The first portion 524 of the PCI bus 524 is supplied to a field-effect transistor (FET) 528 which in turn is coupled to wires 530 of the port A 504. The second portion 526 of the PCI bus 526 is supplied to a FET 532 which is then coupled to wires 534 of the port A 504. The FETs 528 and 532 are controlled by a control line 536 containing an EN_PCI signal produced by the control circuitry 510 within the I/O controller 502. The I/O controller 502 also produces a floppy bus 538 which is supplied to a FET 540 which is in turn coupled to the wires 530 of the port A 504. The FET 540 is controlled by a control line 542 containing an EN_FLOPPY signal produced by the control circuitry 510 within the I/O controller 502. The I/O controller 502 also produces an IDE bus 544. The IDE bus 544 is supplied to a FET 546 which is also connected to the wires 534 of the port A 504. The FET 546 is controlled by a control line 548 containing an EN_IDE signal produced by the control circuitry 510 within the I/O controller 502.

The port A 504 also receives power from the I/O interface apparatus 500. A battery wire 550 of the port A 504 is coupled to or isolated from a battery via FET 552. A first power line 554 is coupled to or isolated from a first power supply (e.g., 5 volts) via a FET 556. A second power line 558 is coupled to or isolated from a second power supply (e.g., 3.3 volts) via a FET 560. Each of the FETs 552, 556 and 560 are controlled by a control line 562 which applies a PWR_EN signal to the control gate of the FETs 552, 556 and 560. The control circuitry 510 of the I/O controller 502 produces the PWR_EN signal. The control circuitry 510 also produces a RESET signal on line 564 which is supplied to the port A 504. The port A 504 is fully activated after the RESET signal on line 564 has a high logic state.

Although the I/O controller 502 is described above and illustrated in FIG. 5 as including the connect/disconnect detector 506, the peripheral device recognizer 508 and the control circuitry 510, the operations carried out by the I/O controller 502 can be achieved by various embodiments that would be immediately recognizable by those in the art. For example, the control circuitry 510 could include circuitry to perform the operations performed by the connect/disconnect detector 506 and the peripheral device recognizer 508, thereby obviating the need for somewhat separate circuitry for the connect/disconnect detector 506 and the peripheral device recognizer 508. The I/O controller 502 could also include the isolation circuitry (e.g., 528, 532, 540, 546) and power control circuitry (e.g., 552, 556, 560) shown in FIG. 5 as being separate from the I/O controller 502.

The operation of the I/O interface apparatus 500 shown in FIG. 5 provides both multiple bus formats to a single port as well as safe connection of peripheral devices. Such operations are explained with reference to FIGS. 6 and 7 below.

Figure 6:
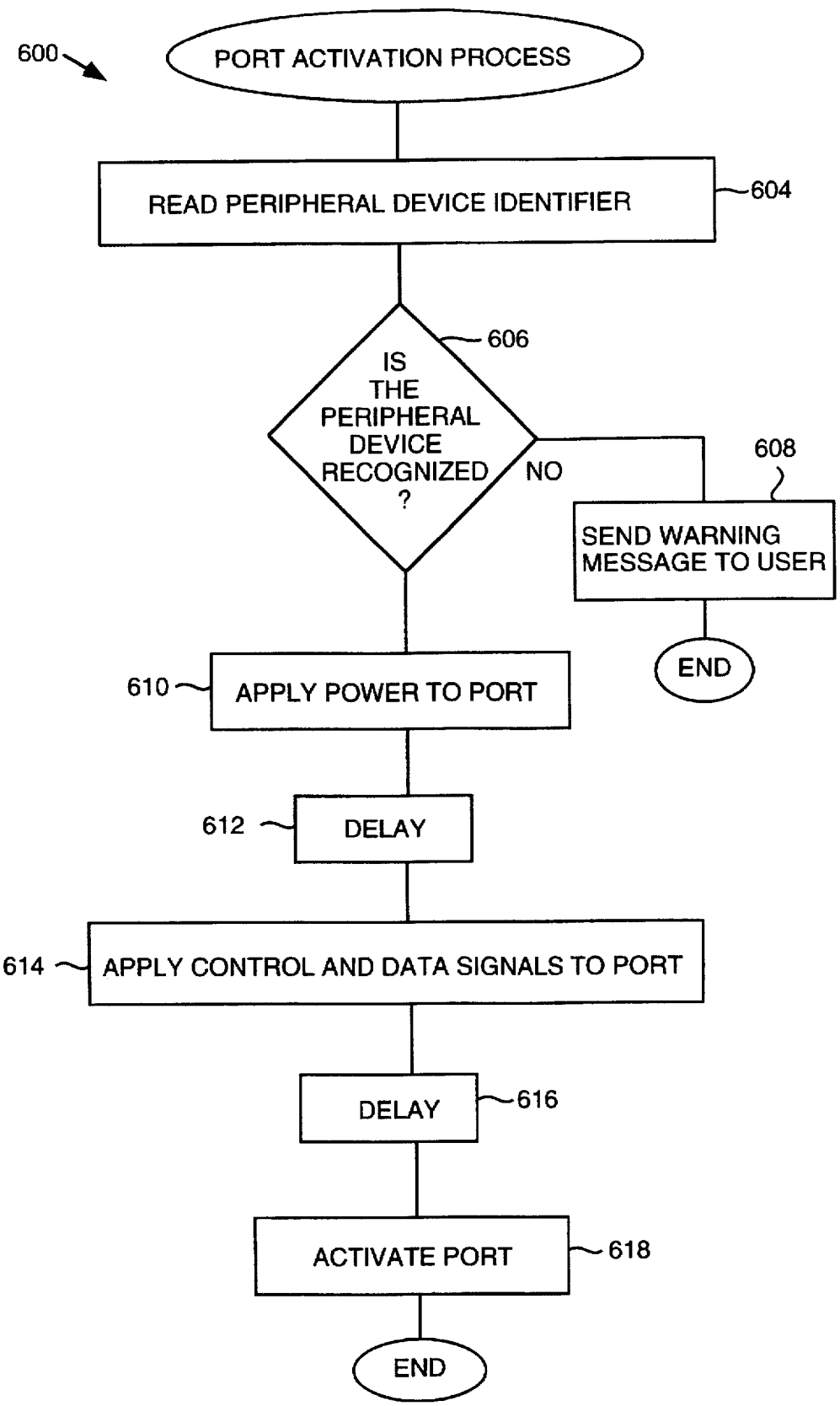
FIG. 6 is a flow chart of a port activation process according to an embodiment of the invention.

FIG. 6 is a flow chart of a port activation process 600 according to the invention. Although the port activation process 600 is explained with reference to a flow chart, it should be made clear that the port activation process 600 is implemented primarily in hardware such as that illustrated in FIGS. 1–5 though some low level software could also be used. The port activation process 600 will be described below in the context of the hardware embodiment shown in FIG. 5B though generally applicable to all other embodiments.

The port activation process 600 begins when a peripheral device has just been connected to the port. The connection of a peripheral device to the port is determined by the DEV_IN signal. Namely, the connection of a peripheral device to the port pulls the DEV_IN signal low which triggers a hardware interrupt that invokes the port activation process 600. Hence, once a peripheral device has been connected to the port, the hardware initiates the port activation process 600 immediately following the connection of a peripheral device to the port. Note that the hardware interrupt triggers the port activation process 600 regardless of the operating state of the computer system. That is, the port activation process 600 will begin immediately following the connection of the peripheral device to the port even if the data processing system or computer system is locked-up or "hung" at the time the peripheral device is connected. In fact, because the device activation process 600 is invoked with hardware, the detection of the connection of the peripheral device and the invocation of the port activation process 600 is very rapid (on the order of a few nanoseconds) and is not dependent on software (i.e., interrupt handler routines).

Once the connection of a peripheral device has been detected, the process 600 reads 604 a peripheral device identifier. The peripheral device identifier 604 originates on the peripheral device and is then supplied to the I/O controller 502 via the port to which the peripheral device is connected. For example, with respect to FIG. 5B, the peripheral device identifier provided by the peripheral device is three-bits wide and supplied on lines 516, 518 and 520 as DEV_ID_1, DEV_ID_2 and DEV_ID_3. Although FIG. 5B uses three 1-bit lines to supply the peripheral device identifier to the I/O controller 502, those skilled in the art should recognize that the number of peripheral device identifiers and their width can vary depending on the number and resolution of identifications desired. For example, the three 1-bit lines provided in FIG. 5B can provide eight distinct identifications. The identifier can also specify additional details, beyond I/O bus standard, to the I/O controller 502 such as I/O bus speed or peripheral voltage requirements. As an example, since the IDE bus standard has various speed categories associated therewith, the speed category of IDE could also be specified to the I/O controller 502.

After the peripheral device identifier is read 604, a decision 606 determines whether the peripheral device is recognized. Here, the peripheral device identifier read 604 is compared with predetermined identifiers stored within the I/O interface apparatus 500 to determine if the peripheral device identifier read 604 matches any of the predetermined identifiers. For example, with respect to FIG. 5, the peripheral device recognizer 508 compares the peripheral identifier (DEV_ID_1, DEV_ID_2 and DEV_ID_3) with the predetermined identifiers. Table 1 above shows examples of the predetermined identifiers stored within the I/O interface apparatus 500. If the peripheral device identifier does not match any of the predetermined identifiers, then the peripheral device should not be connected to the port A 504. Hence, in this case, a warning message is sent 608 to the user of the computer system advising the user that the peripheral device recently connected to the port A 504 cannot be used with the port A. In this case, following block 608, the port activation process 600 ends. Hence, in this case, the I/O controller 502 does not activate the port A 504 because doing so is not safe since the peripheral device connected to port A 504 is unknown to the I/O controller 502.

On the other hand, if the peripheral device is recognized, the I/O controller 502 is able to supply the appropriate bus signals and produce the needed control signals so that the peripheral device connected to the port A 504 operates correctly and safely with the computer system. Specifically, the port activation method 600 first applies 610 power to the port. For example, with respect to FIG. 5, the PWR_EN signal on line 562 is used to apply power to the port A 504. Next, the hardware performing the port activation process 600 delays 612 for a predetermined amount of time after power is applied 610 so that a power plane associated with the port A 504 can reach its operating potential.

Following the delay 612, control and data signals for the recognized peripheral device are applied 614. The data signals are coupled to the port and the control signals are connected to circuitry (e.g., isolation devices) within the I/O interface apparatus 500. The data signals (or bus signals) include address and data lines (and a clock line if appropriate) that are associated with the bus specification being implemented as well as various control signals needed by either the implementation or the bus specification. With respect to FIG. 5, the data signals are provided on the buses 522, 538 and 544. The control signals illustrated in FIG. 5 are the EN_FLOPPY signal, the EN_IDE signal, and the EN_PCI signal. Following block 614, the hardware implementing the port activation process 600 delays 616 for a predetermined amount of time. The delay 616, in this case, is to allow the data and control signals which have been enabled in block 614 to stabilize. Following block 616, the port is activated 618. In a preferred embodiment, the port is previously deactivated by holding a reset line (FIG. 5, RESET signal on line 564) low when a device is not connected to the port or the device connected to the port is not recognized by the I/O interface apparatus 500. In block 618, the port is preferably activated by pulling up the reset line. Hence, the port is activated by the hardware implementing the activation process 600 only after the peripheral device which is connected to the port is recognized and the signals being supplied thereto are stabilized.

Figure 7:
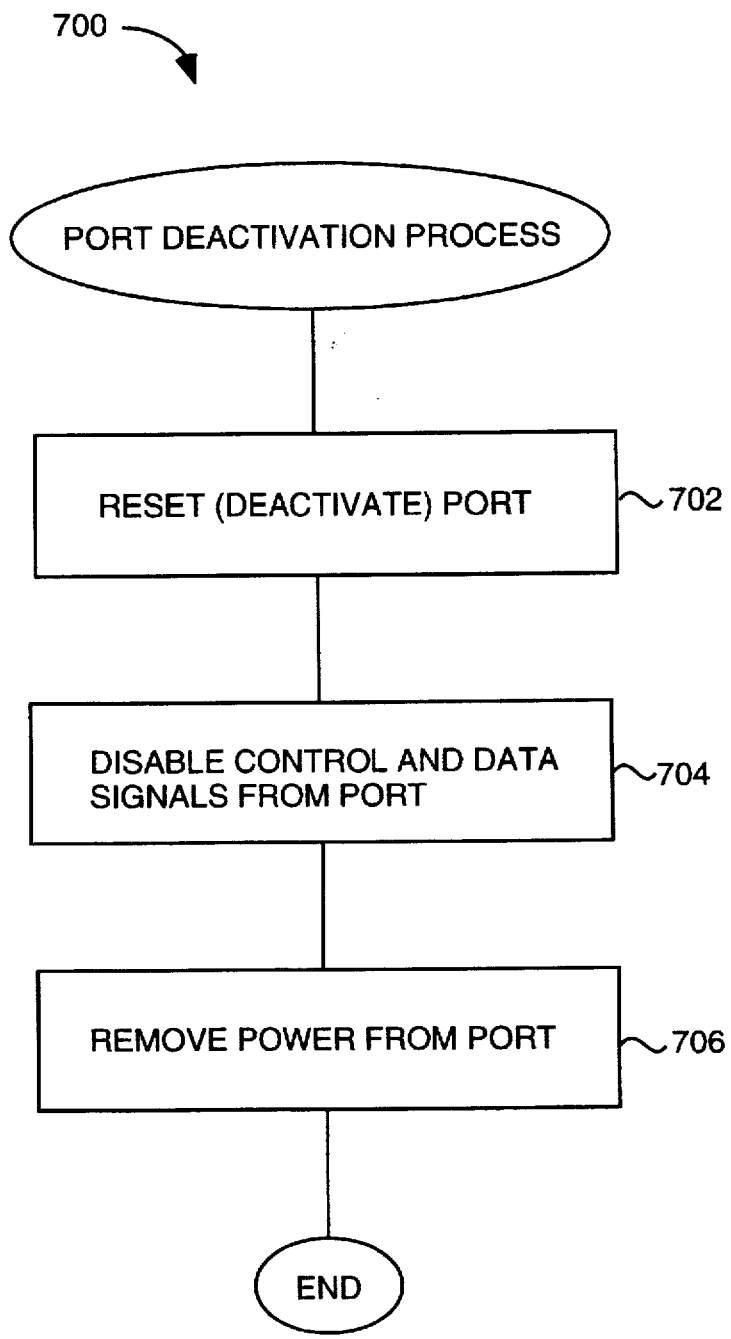
FIG. 7 is a flow chart of a port deactivation process according to an embodiment of the invention.

FIG. 7 is a flow chart of a port deactivation process 700 according to the invention. Like the port activation process 600, the port deactivation process 700 is implemented primarily by hardware such as that illustrated in FIG. 5. The port deactivation process 700 begins when a peripheral device has just been disconnected from the port. Here, the hardware invoking the port deactivation process 700 triggers a hardware interrupt whenever the DEV_IN signal transitions from low to high. If the peripheral device remains connected, nothing happens in the port deactivation process 700 because the port is not to be deactivated. On the other hand, when the peripheral device has just been disconnected the port deactivation process 700 operates to rapidly safeguard the computer system from dangerous situations. For example, if the peripheral device connected to the port is disconnected and another different peripheral device is connected that is not support by the I/O interface apparatus 500, the hardware will protect against damage to either the I/O interface apparatus or the peripheral device. In particular, the port deactivation process 700 immediately deactivates (i.e., resets) the port 702, disables 704 control and data signals from the port, and removes 706 power from the port.

By primarily using hardware to perform these operations, the I/O interface apparatus ensures that the port will be deactivated almost instantaneously after the disconnection of a peripheral device from the port. Consequently, the port is ready to accept connections of peripheral devices to the port in accordance with the port activation process 600. Previously, software polling or software interrupts have been used to deactivate ports of computer devices. However, the conventional software techniques are ineffective because they are slow and also particularly dangerous if the computer system is locked-up or "hung" at the time the peripheral device is disconnected and another non-supported peripheral device is connected, in which case the later connection is not safe.

Figure 8:
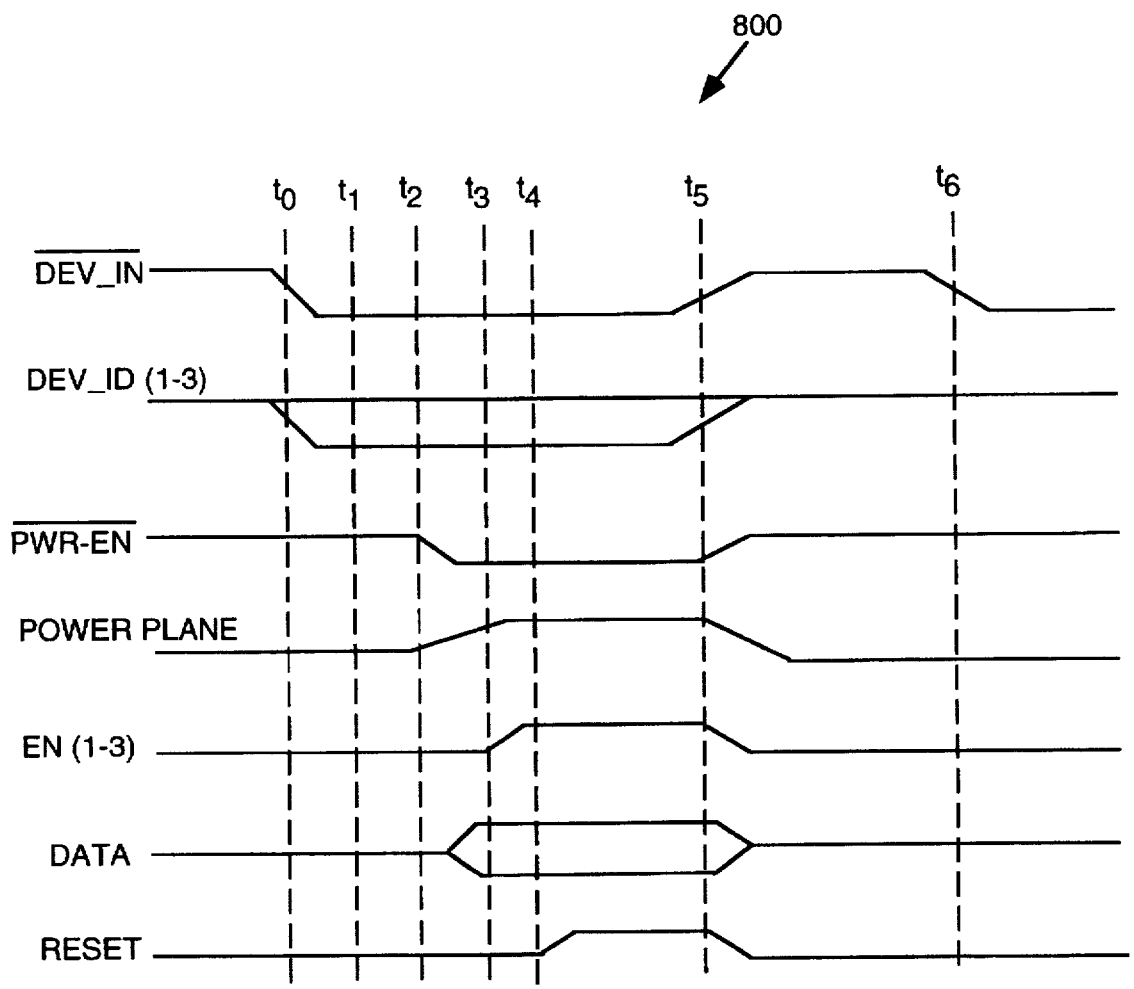
FIG. 8 is a timing diagram illustrating signals associated with an embodiment of the port activation process and the port deactivation process.

FIG. 8 is a timing diagram 800 illustrating signals associated with an embodiment of the port activation process 600 (FIG. 6) and the port deactivation process 700 (FIG. 7) with reference to FIG. 5B. The RESET signal is initially low (low logic state), thus making the port inactive. When the peripheral device is connected, the DEV_IN signal transitions at time to from high (high logic state) to low. At the same time the lines 516, 518 and 520 supplying the device identifier (i.e., DEV_ID(1–3)) stabilize. The device identifier is read at time $t_1$. Thereafter, if the hardware recognizes the peripheral device, power is supplied to the port (i.e., PWR_EN signal goes low) at time $t_2$. A delay period is then waited so that the potential of the power plane can reach its operating potential. This delay is illustrated in FIG. 8 as the time period between time $t_2$ and $t_3$. At $t_3$, the control signals (i.e., EN (1–3)) are applied to the isolation devices so as to couple the appropriate I/O bus to the port. The time period between $t_3$ and $t_4$ allows the data signals associated with the appropriate I/O bus to stabilize. Finally, at time $t_4$ the RESET signal is brought high, thereby activating the port.

The deactivation process 700 is triggered by the DEV_IN signal going high. At time $t_5$, the timing diagram assumes that the peripheral device is disconnected. Immediately after detecting the transition of the DEV_IN signal from low to high, the port is reset (RESET signal is brought low), the control signals (i.e., EN (1–3)) are removed, and the power is removed from the port (i.e., PWR_EN signal goes high). These actions deactivate the port in rapid fashion so that the port can immediately and safely receive another peripheral device for connection (e.g., time $t_6$).

FIG. 9 illustrates a table 900 containing preferred connector pin assignments for supporting IDE and floppy buses along with the PCI bus. The connector pin assignments are for a 90-pin connector intended for use on a portable computer produced by Apple Computer, Inc. A connector with such pin assignments would be suitable for use with the I/O interface apparatus 500 shown in FIG. 5B. The designations used in FIG. 9 would be understood by those in the art and therefore do not require any lengthy discussion. As usual, "I" designates inputs, "O" designates outputs, and "I/O" designates input/outputs. The designation "M" refers to multiplexed signals, the designation "S" refers to nonmultiplexed, single source, 3-state signals, and the designation "R" refers to reserved pin for later use. The use of the long ground pins (LONG AGND) is explained in U.S. Pat. No. 5,323,291 previously incorporated by reference.

Figure 10:
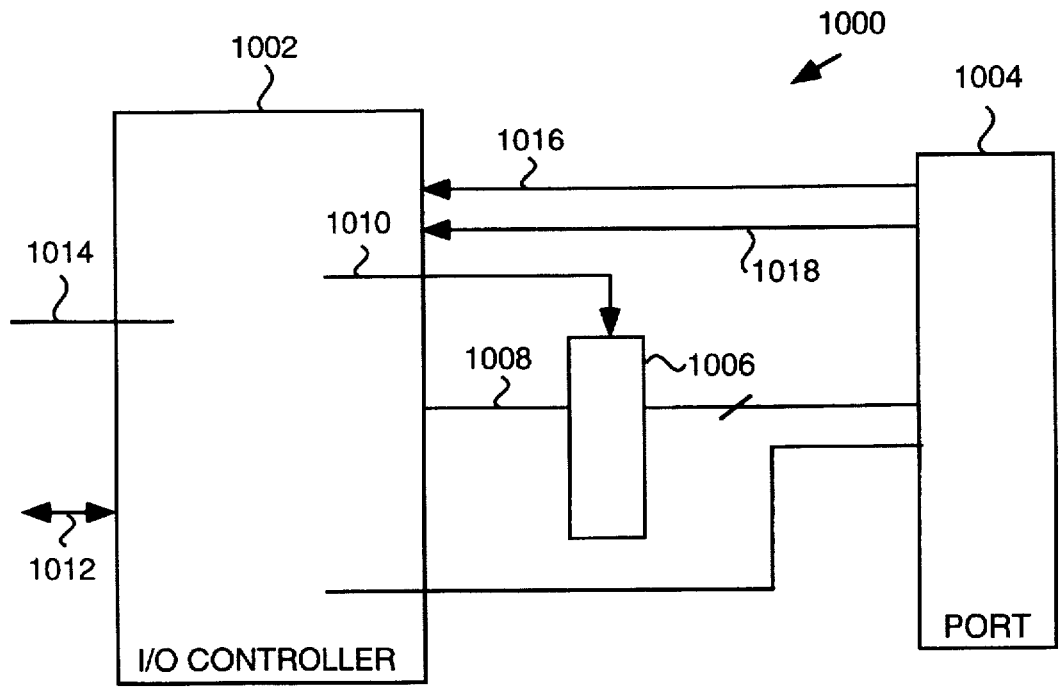
FIG. 10 is a block diagram of an input/output interface apparatus according to another embodiment of the invention.

FIG. 10 is a block diagram of an I/O interface apparatus 1000 according to another embodiment of the invention. The I/O interface apparatus 100, which is typically part of a computer system, includes an I/O controller 1002, a port 1004, and isolation circuitry 1006. The isolation circuitry 1006 operates to isolate or couple bus signals 1008 output from the I/O controller 1002 to the port 1004 in dependence upon a first enable signal 1010 which is supplied to the isolation circuitry 1006. Hence, the I/O controller 1002 controls whether the bus signals 1008 are isolated from the port 1004. The manner in which the I/O controller 1002 performs such operations are discussed in detail below with reference to FIG. 12.

The I/O controller 1002 also receives an incoming bus 1012, a software-controlled signal 1014, a device connect/disconnect signal 1016, a device identifier 1018, and a monitored signal 1020. The incoming bus 1012 can be of any standard, including for example ISA, IDE, floppy or PCI. The software-controlled signal 1014 is provided by the computer system. The usage of the software-controlled signal 1014 can vary, but one such use is discussed in detail with respect to the BUS_SEL signal used in FIG. 12. The device identifier 1018 is one or more lines from the port 1004 that serve to identify the type of the peripheral device connected to the port 1004. The monitored signal 1020 is a signal provided by the port 1004 and monitored by the I/O controller 1002 to determine whether power has been supplied to the port 1004. For example, in the case where the bus signals 1008 are of the IDE standard, the monitored signal 1020 is preferably one of the control signals of the IDE bus (preferably the CS3FX line). The monitored signal 1020 does not pass through the isolation circuitry 1006, typically it is only the data and address signals of the bus signals 1008 that need to be isolated.

In general, the I/O controller 1002 is constructed and operates much like the I/O controllers of the previously described embodiments, the only major difference being the monitoring signal 1020 and its use by the I/O controller 1002. The I/O controller 1002 begins its port activation operations when the device connect/disconnect signal 1016 indicates that a peripheral device is connected to the port 1004. Then, the I/O controller 1002 reads the device identifier 1018 and determines whether the peripheral device is recognized. If the peripheral device is not recognized, it is not safe to activate the port; hence, the port 1004 remains isolated from the port via the isolation circuitry 1006. On the other hand, if the peripheral device is recognized, then power is supplied to the port 1004. However, unlike the processing shown in FIG. 6, the I/O controller 1002 then monitors the monitoring signal 1020 to determine if the port 1004 is properly powered. If the port 1004 does not properly power-up, the bus signals 108 remains isolated from the I/O controller 102 and the I/O controller 1002 may also cause a warning message to be displayed to the user. Reasons for not properly powering up include shorts or other damage in the peripheral device or I/O interface apparatus. On the other hand, if the port 1004 does power-up correctly, then the bus signals 108 are coupled to the I/O controller 1002 by the first enable signal 1010. Thereafter, after a delay to allow the bus signals 108 to stabilize, the port is activated (reset). The deactivation operation of the I/O controller 1002 is the same as the processing shown in FIGS. 7 and 8.

Note that actually it is only necessary to isolate certain of the lines connecting the port 1004 and the I/O controller 1002 because some lines do not impact the safeness of the peripheral connection. At least, the data and address lines of the bus being supplied to the port should be isolated. Although power and reset signals are not illustrated in FIG. 10, these signals are supplied to the port via the I/O controller as with prior embodiments or via some other circuitry (see e.g., controller 1204 in FIG. 12).

Figure 11:
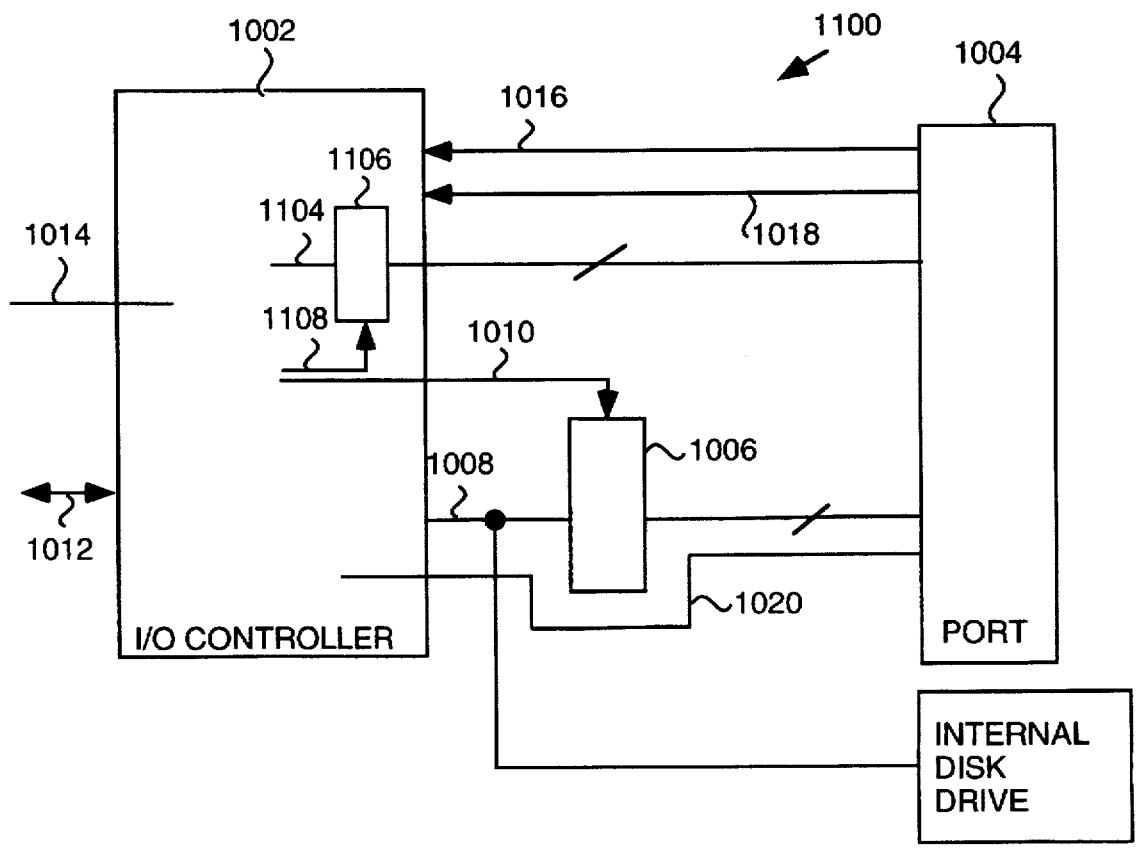
FIG. 11 is a block diagram of an input/output interface apparatus according to another embodiment of the invention.

FIG. 11 is a block diagram of an I/O interface apparatus 1100 according to the invention. The I/O interface apparatus 1100 has many components that are similar to that of the I/O interface apparatus 1000 of FIG. 10. Additionally, the I/O interface apparatus 1100 includes an internal disk drive 1102 connected to the bus signals 1008. Here, the same bus signals 1008 are shared by the peripheral device connected to the port 1004 and the internal disk drive. By sharing the bus signals 1008, an additional set of bus signals is alleviated. However, it is important that the bus signals 1008 be isolated from the port 1004 so as to prevent the corruption of the signals destined for the internal disk drive 1102 during connection and disconnection of peripheral devices at the port 1004. Further, the I/O controller 1002 supports another bus standard on bus signals 1104. The I/O controller 1002 produces the bus signals 1104 from the incoming bus 1012. Isolation circuitry 1106 operates to isolate or couple the bus signals 1104 with the port 1004 in dependence upon a second enable signal 1108 which is supplied to the isolation circuitry 1108. Hence, the I/O controller 1002 controls not only whether the bus signals 1008 are isolated from the port 1004, but also whether the bus signals 1104 are isolated from the port 1004. Thus, a peripheral device connected to the port 1004 can use either the bus signals 1008 or the bus signals 1104. Moreover, the I/O interface apparatus 1100 ensures that the bus signals 1008, 1104 are isolated from the port 1004 until a peripheral device connected to the port 1004 is recognized and power is present at the port. The manner in which the I/O controller 1002 performs such operations are discussed in detail below with reference to FIG. 12.

Figure 12:
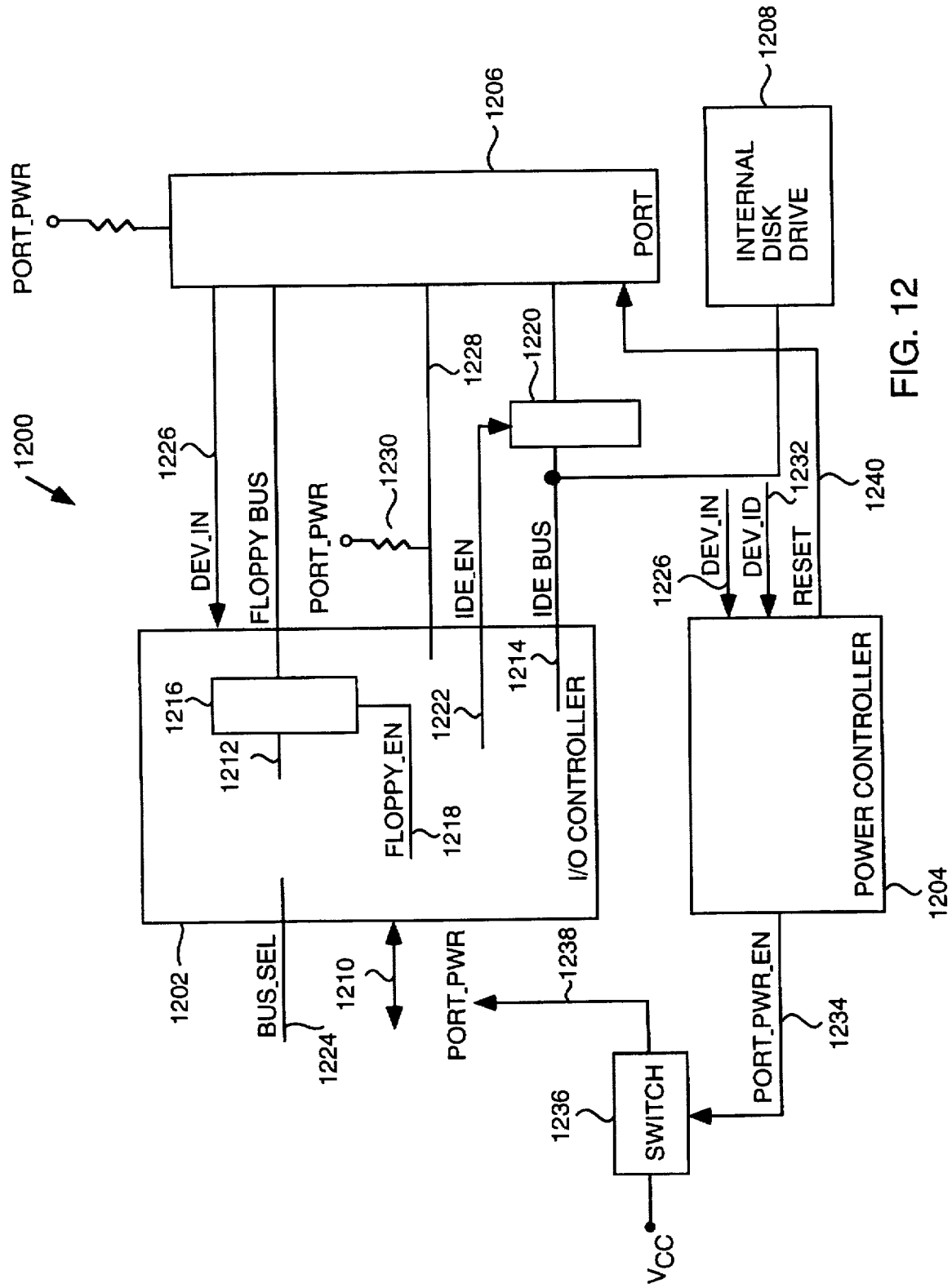
FIG. 12 is a detailed schematic diagram of an input/output interface apparatus according to another embodiment of the invention.

FIG. 12 is schematic diagram of an I/O interface apparatus 1200 according to the invention. The I/O interface apparatus 1200 includes an I/O controller 1202, a power controller 1204, a port 1206, and an internal disk drive 1208. Typically, the I/O interface apparatus 1200 is part of a computer system and the I/O interface apparatus 1200 operates to control input and output operations between the computer system and various peripheral devices. Here, the peripheral devices include the internal disk drive 1208 and whatever peripheral device is connected to the port 1206.

The I/O controller 1202 receives the incoming bus 1210 and produces a therefrom a floppy bus 1212 and an IDE bus 1214. The floppy bus 1212 is connected to the port 1206 via an isolation buffer 1216. The isolation buffer 1216 either couples or isolates the floppy bus 1212 with the port 1206 based on a floppy enable signal 1218. The IDE bus 1214 is connected to the internal disk drive 1208 directly and connected to the port 1206 via an isolation buffer 1220. The isolation buffer 1220 either couples or isolates the IDE bus 1214 with the port 1206 depending on the IDE enable signal 1222. The floppy enable signal 1218 and the IDE enable signal 1222 are produced by the I/O controller 1202 as discussed below.

The I/O controller 1202 also receives a bus selection signal 1224, a device connect/disconnect signal 1226, and a port power monitoring signal 1228. The bus selection signal 1224 selects which of the floppy or IDE buses to supply to the port 1206. The bus selection signal 1224 is preferably controlled by software associated with the computer system. The device connect/disconnect signal 1226 is a signal that is high when no peripheral device is connected to the port 1206 because the signal is pulled-up by the I/O controller 1202 or other circuitry, but is low when a peripheral device is connected to the port 1206 because a connected peripheral device pulls the signal low. The port power monitoring signal 1228 is a signal line connected between the port 1206 and the I/O controller 1202. A pull-up resister 1230 pulls up the port power monitoring signal 1228 to the potential of PORT_PWR. If the port is properly power, then the port power monitoring signal 1228 is pulled high; otherwise, the port power monitoring signal 1228 remain low. Based on the port power monitoring signal, the I/O controller 1202 determines whether it is safe to couple either of the buses 1212, 1214 to the port 1206.

In the embodiment shown in FIG. 12, since the power controller 1024 is an existing power management unit in many Macintosh portable computers by Apple Computer, Inc., the power controller 1204 can be used to perform some of the operations done by the I/O controllers in previously described embodiments. In FIG. 12, the power controller 1204 receives the device connect/disconnect 1226 and a device identifier 1232. Using these signals, the power controller 1204 determines whether power should be supplied to the port 1206 as well as controls a reset signal 1236 for the port 1206. Namely, the power controller 1204 produces an active power enable signal 1234 only after the device connect/disconnect signal 1226 indicates that a peripheral device is connected to the port 1206 and the device identifier is recognized as a type of peripheral device supported by the port 1206. The power enable signal 1234 then turns on a switch 1236 that causes power (PORT_PWR) to be connected to the port 1206.

After the peripheral device is connected to the port, the peripheral device is recognized, the port is powered, and the port indicates that it is properly powered, the bus signals are supplied to the port. Thereafter, after the bus signal stabilize, the port is reset to activate the port. Hence, all accesses and communications with the port 1206 are contingent upon the peripheral device being present (connected) and power properly present at the port 1206.

When a previously connected peripheral device is removed (as detected by the device connect/disconnect signal 1226) from the activated port, the port is deactivated by almost immediately isolating the buses 1212, 1214 from the port 1206 using hardware. Additionally, the power (PORT_PWR) 1238 to the port 1206 and the reset signal 1240 are removed. In this embodiment, the power controller 1204 causes these signal to be removed through low level software contained therein. Consequently, the power 1238 and the reset signal 1240 are removed slightly after the almost immediate isolation of the buses 1212, 1214, but the software lag is neither needed nor harmful.

FIG. 13 illustrates a table 1300 containing preferred connector pin assignments for supporting IDE and floppy buses for the port 1206 in FIG. 12. AMP part no. C-93-1817-53 and C-93-1817-54 are suitable for the connector. The connector pin assignments are for a 90-pin connector intended for use on a portable computer produced by Apple Computer, Inc. A connector with such pin assignments would be suitable for use with the I/O interface apparatus 500 shown in FIG. 5B. The designations used in FIG. 9 would be understood by those in the art and therefore do not require any lengthy discussion. As usual, "I" designates inputs, "O" designates outputs, and "I/O" designates input/outputs. The designation "M" refers to multiplexed signals, the designation "S" refers to non-multiplexed, single source, 3-state signals, and the designation "R" refers to reserved pin for later use. The use of the long ground pins (LONG AGND) is explained in U.S. Pat. No. 5,323,291 previously incorporated by reference.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An input/output interface apparatus for a peripheral port of a data processing system, a peripheral device connects to the data processing system by coupling to the peripheral port, said apparatus comprising:

a connect/disconnect detector for determining whether a device has been connected to or disconnected from the peripheral port;

a peripheral device recognizer for recognizing a type of the device that has been connected to the peripheral port; and control circuitry, operatively connected to said connect/disconnect detector and said peripheral device recognizer, for supplying power to the peripheral port for the device that has been connected to the peripheral port only after the type of the device is recognized by said peripheral device recognizer and for withdrawing power from the peripheral port whenever the device is disconnected from the peripheral port, wherein the data processing system is a docking station, and the peripheral port is a docking port.

2. An input/output interface apparatus as recited in claim 1, wherein said peripheral device recognizer determines whether the device connected to the peripheral port is a type that is recognized based on a peripheral identifier supplied to said peripheral device recognizer by the device via the peripheral port.

3. An input/output interface apparatus as recited in claim 2, wherein said control circuitry further couples bus signals to the peripheral port, wherein a plurality of different types of devices can peripheral port, and wherein the bus signals coupled to the peripheral port by said control circuitry have an I/O bus format dependent upon the type of the device connected to the peripheral port.

4. An input/output interface apparatus as recited in claim 2, wherein said control circuitry supplies activation signals to the peripheral port based on the type of the device connected to the peripheral port only after the type of the device is recognized by said peripheral device recognizer.

5. An input/output interface apparatus as recited in claim 4, wherein the activation signals comprise a power signal, a reset signal and I/O signals.

6. An input/output interface apparatus as recited in claim 4, wherein when the peripheral device is both connected to the peripheral port and recognized, said control circuitry supplies the activation signals to the peripheral port in the following sequential order:

(i) the power signal is first supplied to the peripheral port;

(ii) then after a first predetermined delay, the I/O signals are supplied to the peripheral port; and (iii) then after a second predetermined delay, the reset signal is supplied to the peripheral port.

7. An input/output interface apparatus as recited in claim 1, wherein said control circuitry supplies bus signal to the peripheral port only after the presence of the power at the peripheral port is detected.

8. An input/output interface apparatus as recited in claim 7, wherein said control circuitry further activates the peripheral port a second predetermined amount of time after the bus signals are coupled to the peripheral port.

9. An input/output interface apparatus as recited in claim 8, wherein the bus signals coupled to the peripheral port have an I/O bus format dependent upon the type of the device connected to the peripheral port.

10. An input/output interface apparatus for a peripheral port of a data processing system, a peripheral device connects to the data processing system by coupling to the peripheral port, said apparatus comprising:

a connect/disconnect detector for determining whether a device has been connected to or disconnected from the peripheral port;

a peripheral device recognizer for recognizing a type of the device that has been connected to the peripheral port; and control circuitry, operatively connected to said connect/disconnect detector and said peripheral device recognizer, for supplying power to the peripheral port for the device that has been connected to the peripheral port only after the type of the device is recognized by said peripheral device recognizer and for withdrawing power from the peripheral port whenever the device is disconnected from the peripheral port, said control circuitry further couples bus signals to the peripheral port a first predetermined amount of time after power is supplied to the peripheral port, and when power is not supplied to the peripheral port said control circuitry isolates the bus signals from the peripheral port.

11. An input/output interface apparatus as recited in claim 10, wherein a first device and a second device are substantially simultaneously connected to the peripheral port, and wherein the bus signals coupled to the peripheral port by said control circuitry include a first set of signals of a first I/O interface format and a second set of signals of a second I/O interface format, the first set of signals being provided for the first device and the second set of signals being provided for the second device, and the first set and the second set of signals are substantially simultaneously coupled to the peripheral port.

12. An input/output interface apparatus as recited in claim 10, wherein said control circuitry further activates the peripheral port a second predetermined amount of time after the bus signals are coupled to the peripheral port.

13. An input/output interface apparatus as recited in claim 12, wherein the bus signals coupled to the peripheral port have an I/O bus format dependent upon the type of the device connected to the peripheral port.

14. An input/output interface apparatus as recited in claim 12, wherein a first device and a second device are connected to the peripheral port, and wherein the bus signals coupled to the peripheral port include a first set of signals of a first I/O interface format and a second set of signals for a second I/O interface format, the first set of signals being supplied to the first device and the second set of signals being supplied to the second device.

15. An input/output interface apparatus as recited in claim 14, wherein the first and second devices are connected to the peripheral port with a common connector.

16. An input/output interface apparatus as recited in claim 10, wherein the bus signals are supplied to the peripheral port as PCI bus signals, or alternatively, as floppy bus signals and/or IDE bus signals.

17. An input/output interface apparatus as recited in claim 10, wherein a first device and a second device are connected to the peripheral port, and wherein the bus signals coupled to the peripheral port include a first set of signals of a first I/O interface format and a second set of signals for a second I/O interface format, the first set of signals being supplied to the first device and the second set of signals being supplied to the second device.

18. An input/output interface apparatus for at least one peripheral port of a data processing system, said apparatus comprising:

an input/output (I/O) controller for receiving a first I/O bus having a first I/O bus format and producing at least a second I/O bus format on a second I/O bus and a third I/O bus format on a third I/O bus, and for producing I/O bus selection signals;

a port connector for receiving I/O bus lines; and isolation circuits, operatively connected between said input/output controller and the I/O bus lines of said port connector, for individually isolating the first, second and third I/O buses from the I/O bus lines of said port connector in accordance with the I/O bus selection signals, wherein said isolation circuits are able to concurrently connect any two of the first, second and third I/O buses to the I/O bus lines of said port connector for concurrent utilization.

19. An input/output interface apparatus as recited in claim 18, wherein said isolation circuits comprise:

first isolation circuits for isolating or coupling the first I/O bus with the I/O bus lines in accordance with the I/O bus selection signals;

second isolation circuits for isolating or coupling the second I/O bus with the I/O bus lines in accordance with the I/O bus selection signals; and third isolation circuits for isolating or coupling the third I/O bus with the I/O bus lines in accordance with the I/O bus selection signals.

20. An input/output interface apparatus as recited in claim 18, wherein the format of the second and third I/O buses are different.

21. An input/output interface apparatus as recited in claim 18, wherein said isolation circuits comprise:

first isolation circuits for isolating or coupling the second I/O bus with the I/O bus lines in accordance with the I/O bus selection signals;

second isolation circuits for isolating or coupling the third I/O bus with the I/O bus lines in accordance with the I/O bus selection signals.

22. An input/output interface apparatus as recited in claim 21, wherein the only one of the second I/O bus and the third I/O bus can be coupled to the I/O bus lines for said port connector at any point in time.

23. An input/output interface apparatus as recited in claim 18, wherein said input/output controller comprises:

a connect/disconnect detector for determining whether a device has been connected or disconnected to said port connector;

a peripheral device recognizer, operatively connected to said connect/disconnect detector, for recognizing a type of the device that said connect/disconnect detector determines has been connected;

control circuitry, operatively connected to said connect/disconnect detector and said peripheral device recognizer, for producing the I/O bus selection signals.

24. An input/output interface apparatus as recited in claim 23, wherein said input/output controller further produces a reset signal based on whether said peripheral device recognizer recognizes the type of the device that has been connected, and said port connector receives the reset signal.

25. An input/output interface apparatus as recited in claim 24, wherein said input/output controller further produces a power signal which is supplied to said port connector, and wherein said control circuitry further comprises means for producing the power signal based on whether said peripheral device recognizer recognizes the type of the device that has been connected.

26. An input/output interface apparatus as recited in claim 23, wherein the I/O bus selection signals are supplied to said isolation circuits dependent on the type of the device connected to said port connector.

27. An input/output interface apparatus for at least one peripheral port of a data processing system, said apparatus comprising:

an input/output (I/O) controller for receiving a first I/O bus having a first I/O bus format and producing at least a second I/O bus format on a second I/O bus and a third I/O bus format on a third I/O bus, and for producing I/O bus selection signals;

a port connector for receiving I/O bus lines; and isolation circuits, operatively connected between said input/output controller and the I/O bus lines of said port connector, for individually isolating the first, second and third I/O buses from the I/O bus lines of said port connector in accordance with the I/O bus selection signals, wherein said isolation circuits comprise:

first isolation circuits for isolating or coupling the first I/O bus with the IO bus lines in accordance with the I/O bus selection signals;

second isolation circuits for isolating or coupling the second I/O bus with the I/O bus lines in accordance with the I/O bus selection signals; and third isolation circuits for isolating or coupling the third I/O bus with the I/O bus lines in accordance with the I/O bus selection signals, and wherein the I/O bus selection signals cause one of the following:

(i) the first isolation circuit couples the first I/O bus to the I/O bus lines and the second and third isolation circuits isolate the second and third buses from the I/O bus lines;

(ii) the second isolation circuit couples the second I/O bus to the I/O bus lines and the first and third isolation circuits isolate the first and third buses from the I/O bus lines;

(iii) the third isolation circuit couples the third I/O bus to the I/O bus lines and the first and second isolation circuits isolate the first and second buses from the I/O bus lines; and (iv) the second and third isolation circuits couple the second and third I/O buses concurrently to different parts of the I/O bus lines and the first isolation circuit isolates the first bus from the I/O bus lines.

28. An input/output interface apparatus as recited in claim 27, wherein the first I/O bus is a PCI bus, the second I/O bus is a floppy bus, and the third bus is an IDE bus.

29. An input/output interface apparatus for at least one peripheral port of a data processing system, said apparatus comprising:

an input/output (I/O) controller for receiving a first I/O bus having a first I/O bus format and producing at least a second I/O bus format on a second I/O bus and a third I/O bus format on a third I/O bus, and for producing I/O bus selection signals, said input/output controller includes at least, a connect/disconnect detector for determining whether a device has been connected or disconnected to said port connector, a peripheral device recognizer operatively connected to said connect/disconnect detector, for recognizing a type of the device that said connect/disconnect detector determines has been connected, and control circuitry operatively connected to said connect/ disconnect detector and said peripheral device recognizer, for producing the I/O bus selection signals;

a port connector for receiving I/O bus lines; and isolation circuits, operatively connected between said input/output controller and the I/O bus lines of said port connector, for individually isolating the second and third I/O buses from the I/O bus lines of said port connector in accordance with the I/O bus selection signals, wherein said input/output controller further produces a reset signal based on whether said peripheral device recognizer recognizes the type of the device that has been connected, and said port connector receives the reset signal, wherein said input/output controller further produces a power signal which is supplied to said port connector, and said control circuitry comprises means for producing the power signal based on whether said peripheral device recognizer recognizes the type of the device that has been connected, and wherein, when said apparatus detects that a device has been connected and said peripheral device recognizer recognizes the type of the device, said control circuitry first produces the power signal, then produces the I/O bus selection signals, and then produces the reset signal.

30. An input/output interface apparatus for at least one peripheral port of a data processing system, said apparatus comprising:

an input/output I/O controller for receiving a first I/O bus having a first I/O bus format and producing at least a second I/O bus format on a second I/O bus and a third I/O bus format on a third I/O bus, and for producing I/O bus selection signals, said input/output controller includes at least, a connect/disconnect detector for determining whether a device has been connected or disconnected to said port connector, a peripheral device recognizer, operatively connected to said connect/disconnect detector, for recognizing a type of the device that said connect/disconnect detector determines has been connected, and control circuitry, operatively connected to said connect/ disconnect detector and said peripheral device recognizer, for producing the I/O bus selection signals;

a port connector for receiving I/O bus lines; and isolation circuits, operatively connected between said input/output controller and the I/O bus lines of said port connector, for individually isolating the second and third I/O buses from the I/O bus lines of said port connector in accordance with the I/O bus selection signals, and wherein the data processing system is a docking station, and the peripheral port is a docking port.

31. An apparatus for safely connecting a peripheral device to a port of a data processing system while the data processing system is powered-on, said apparatus comprising:

detection means for determining whether a peripheral device has recently been connected to or disconnected from the port;

deactivation means for removing activation signals from the port when said detection means determines that the peripheral device has just been disconnected or when there is no peripheral device connected to the port;

recognition means for determining whether the peripheral device connected to the port is a type that is recognized; and activation means for supplying the activation signals to the port only after said recognition means determines that the type of the peripheral device connected to the port is recognized, wherein the data processing system is a docking station and the port is a docking port.

32. An apparatus as recited in claim 31, wherein said activation means supplies different activation signals to the port dependent upon the type of the peripheral device.

33. An apparatus as recited in claim 31, wherein the activation signals comprise a power signal and bus signals, and wherein said activation means first supplies the power signal to the port, and after a predetermined delay, supplies the bus signals to the port.

34. An apparatus as recited in claim 31, wherein the activation signals comprise a power signal and bus signals, and wherein said activation means first supplies the power signal to the port, and then supplies the bus signals to the port only after power at the port is detected.

35. A method for activating a port of a data processing system, said method comprising:

(a) determining whether a peripheral device has recently been connected to the port while the data processing system is powered-on;

(b) receiving a peripheral identifier from the peripheral device determined to have recently been connected;

(c) determining whether the peripheral device determined to have recently been connected is recognizable based on a peripheral identifier associated with the peripheral device; and (d) activating the port only after the peripheral device determined to have recently been connected is recognized, wherein the data processing system is a docking station and the port is a docking port.

36. A method as recited in claim 35, wherein said activating (d) comprises:

supplying power to the port only after the peripheral device determined to have recently been connected is recognized; and supplying bus signals to the port only after the peripheral device determined to have recently been connected is recognized.

37. A method as recited in claim 36, wherein said method further comprises:

(e) deactivating the port when the peripheral device is disconnected from the port.

38. A method as recited in claim 37, wherein said deactivating (e) isolates at least the bus signals from the port immediately following the disconnection of the peripheral device from the port using hardware.

39. A method for activating a port of a data processing system, said method comprising:

(a) determining whether a peripheral device has recently been connected to the port while the data processing system is powered-on;

(b) receiving a peripheral identifier from the peripheral device determined to have recently been connected;

(c) determining whether the peripheral device determined to have recently been connected is recognizable based on a peripheral identifier associated with the peripheral device; and (d) activating the port only after the peripheral device determined to have recently been connected is recognized, said activating (d) includes at least, (d1) supplying power to the port only after the peripheral device determined to have recently been connected is recognized;

(d2) subsequent to said supplying (d1), delaying for a first predetermined amount of time;

(d3) subsequent to said delaying (d2), supplying bus signals to the port;

(d4) subsequent to said supplying (d3) of the bus signals to the port, delaying a second predetermined amount of time; and (d5) subsequent to said delaying (d4) for the second predetermined amount of time, activating the port.

40. A method as recited in claim 39, wherein said activating (d5) supplies a reset signal to the port.

41. A method for activating a port of a data processing system, said method comprising:

(a) determining whether a peripheral device has recently been connected to the port while the data processing system is powered-on;

(b) receiving a peripheral identifier from the peripheral device determined to have recently been connected;

(c) determining whether the peripheral device determined to have recently been connected is recognizable based on a peripheral identifier associated with the peripheral device; and (d) activating the port only after the peripheral device determined to have recently been connected is recognized, said activating (d) includes at least, supplying power to the port only after the peripheral device determined to have recently been connected is recognized;

monitoring whether the port properly powers-up; and supplying bus signals to the port only after both the peripheral device determined to have recently been connected is recognized and the port properly powers-up.

42. A method as recited in claim 41, wherein said method further comprises:

(e) deactivating the port when the peripheral device is disconnected from the port.

43. A method as recited in claim 42, wherein said deactivating (e) isolates at least the bus signals from the port immediately following the disconnection of the peripheral device from the port using hardware.

44. A method for activating a port of a data processing system, said method comprising:

(a) determining whether a peripheral device has recently been connected to the port while the data processing system is powered-on;

(b) receiving a peripheral identifier from the peripheral device determined to have recently been connected;

(c) determining whether the peripheral device determined to have recently been connected is recognizable based on a peripheral identifier associated with the peripheral device; and (d) activating the port only after the peripheral device determined to have recently been connected is recognized, said activating (d) includes at least, (d1) supplying power to the port only after the peripheral device determined to have recently been connected is recognized;

(d2) waiting for the port to properly power-up;

(d3) subsequent to said waiting (d2), supplying bus signals to the port;

(d4) subsequent to said supplying (d3) the bus signals to the port, delaying a second predetermined amount of time; and (d5) subsequent to said delaying (d4) for the second predetermined amount of time, activating the port.

45. A method as recited in claim 44, wherein said activating (d5) supplies a reset signal to the port.

* * * * *